(12) United States Patent
Nam et al.

(10) Patent No.: US 12,047,964 B2
(45) Date of Patent: Jul. 23, 2024

(54) SEARCH SPACE SET GROUP SWITCHING FOR MONITORING DORMANCY

(71) Applicant: QUALCOMM Incorporated, San Diego, CA (US)

(72) Inventors: Wooseok Nam, San Diego, CA (US); Tao Luo, San Diego, CA (US); Peter Pui Lok Ang, San Diego, CA (US); Ozcan Ozturk, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 17/454,527

(22) Filed: Nov. 11, 2021

(65) Prior Publication Data

US 2022/0159630 A1    May 19, 2022

Related U.S. Application Data

(60) Provisional application No. 63/202,826, filed on Jun. 25, 2021, provisional application No. 63/138,739,
(Continued)

(51) Int. Cl.
*H04W 72/23* (2023.01)
(52) U.S. Cl.
CPC .................................. *H04W 72/23* (2023.01)
(58) Field of Classification Search
CPC ...... Y02D 30/70; H04W 76/28; H04W 52/02; H04W 72/04; H04W 24/02;
(Continued)

(56) References Cited

U.S. PATENT DOCUMENTS

2020/0413410 A1    12/2020   Zhou et al.
2022/0030659 A1*    1/2022   Kim ..................... H04W 76/27
(Continued)

FOREIGN PATENT DOCUMENTS

WO    WO-2004017525 A2 *    2/2004   ............ H04W 12/06

OTHER PUBLICATIONS

3GPP TS 38.213: "3rd Generation Partnership Project, Technical Specification Group Radio Access Network, NR, Physical Layer Procedures For Control (Release 16)", 3GPP Standard, Technical Specification, 3rd Generation Partnership Project (3GPP), Mobile Competence Centre, 650, Route Des Lucioles, F-06921 Sophia-Antipolis Cedex, France, vol. RAN WG1, No. V16.7.0 (Sep. 2021), Sep. 28, 2021 (Sep. 28, 2021), pp. 1-188, XP052056878, Retrieved from the Internet: URL: https://ftp.3gpp.org/Specs/archive/38_series/38.213/38213-g70.zip 38213-g70.docx [retrieved on Sep. 28, 2021], paragraph 10.4.
(Continued)

*Primary Examiner* — Charles C Jiang
*Assistant Examiner* — Debebe A Asefa
(74) *Attorney, Agent, or Firm* — Guang Yu Zhang; Harrity & Harrity, LLP

(57) ABSTRACT

Various aspects of the present disclosure generally relate to wireless communication. In some aspects, a user equipment (UE) may switch from a first group of search space sets for monitoring a physical downlink control channel (PDCCH) to an empty group of search space sets. The UE may refrain from monitoring the PDCCH based at least in part on switching to the empty group. In some aspects, the UE may switch from a first group of PDCCH search space sets to at least one dormant group of PDCCH search space sets identified in configuration information. The UE may also process one or more PDCCH search space sets of the at least one dormant group of PDCCH search space sets based at
(Continued)

least in part on the received configuration information. Numerous other aspects are provided.

30 Claims, 17 Drawing Sheets

Related U.S. Application Data filed on Jan. 18, 2021, provisional application No. 63/198,806, filed on Nov. 13, 2020.

(58) Field of Classification Search
CPC ......... H04W 52/0212; H04W 52/0248; H04W 52/0216; H04W 52/0219; H04W 52/0229; H04W 72/044; H04W 72/0453; H04W 72/23; H04L 5/0098; H04L 5/00; H04L 5/001

See application file for complete search history.

(56) References Cited

U.S. PATENT DOCUMENTS

2022/0039009 A1* 2/2022 Iyer ..................... H04L 5/0098
2022/0132341 A1* 4/2022 Lee ................... H04W 72/0446

OTHER PUBLICATIONS

3GPP TS 38.331: "3rd Generation Partnership Project, Technical Specification Group Radio Access Network, NR, Radio Resource Control (RRC) Protocol Specification (Release 16)", 3GPP Standard, Technical Specification, 3rd Generation Partnership Project (3GPP), Mobile Competence Centre, 650, Route Des Lucioles, F-06921 Sophia-Antipolis Cedex, France, vol. RAN WG2, No. V16.6.0 (Sep. 2021), Sep. 28, 2021 (Sep. 28, 2021), pp. 1-957, XP052056883, Retrieved from the Internet: URL: https://ftp.3gpp.org/Specs/archive/38_series/38.331/38331-g60.zip 38331-g60.docx [retrieved on Sep. 28, 2021], p. 503-p. 504.

Ericsson: "Discussion on Potential Enhancements for Power Savings During Active Time", 3GPP TSG RAN WG1 #102, 3GPP Draft, Tdoc R1-2006668, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 18, 2020-Aug. 28, 2020, 5 Pages, Aug. 8, 2020 (Aug. 8, 2020), XP051918182, Retrieved from the Internet: URL: https://ftp.3gpp.org/tsg_ran/WG1_RL1/TSGR1_102-e/Docs/R1-2006668.zip R1-2006668 Discussion on potential enhancements for power savings during active time.docx [retrieved on Aug. 8, 2020] paragraph [02.7], paragraph 7, Figure 4.
International Search Report and Written Opinion—PCT/US2021/072368—ISA/EPO—May 12, 2022.
Partial International Search Report—PCT/US2021/072368—ISA/EPO—Mar. 15, 2022.
Qualcomm Incorporated: "DCI-Based Power Saving Adaptation During DRX Active Time", 3GPP TSG-RAN WG1 #106-e, 3GPP Draft, R1-2107358, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 16, 2021-Aug. 27, 2021, 7 Pages, Aug. 6, 2021 (Aug. 6, 2021), XP052033557, Retrieved from the Internet: URL: https://ftp.3gpp.org/tsg_ran/WG1_RL1/TSGR1_106-e/Docs/R1-2107358.zip R1-2107358_DCI-based power saving adaptation during DRX Active Time.docx [retrieved on Aug. 6, 2021] paragraph 1, paragraph 2.1, Figures 1, 2, 3.
Qualcomm Incorporated: "Potential Techniques for UE Power Saving", 3GPP Draft, 3GPP TSG-RAN WG1 #96, R1-1903016, Potential Techniques for UE Power Saving, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600713, 33 pages, Retrieved from the Internet: URL: http://www.3gpp.org/ftp/tsg%5Fran/WG1%5FRL1/TSGR1%5F96/Docs/R1%2D1903016%2Ezip [retrieved on Feb. 16, 2019] sections 2-4, paragraph [2. 2 .1]—paragraph [2. 2. 2] paragraph [2. 3 .1.1]—paragraph [2. 3 .1. 2] paragraph [3. 3 .1]—paragraph [3.3.3] paragraph [3. 4 .1]-paragraph [3. 4 .1], sections 1-3, in particular sections 3.1, 3.2, 3.3, 3.4.1. 3.4.2.

* cited by examiner

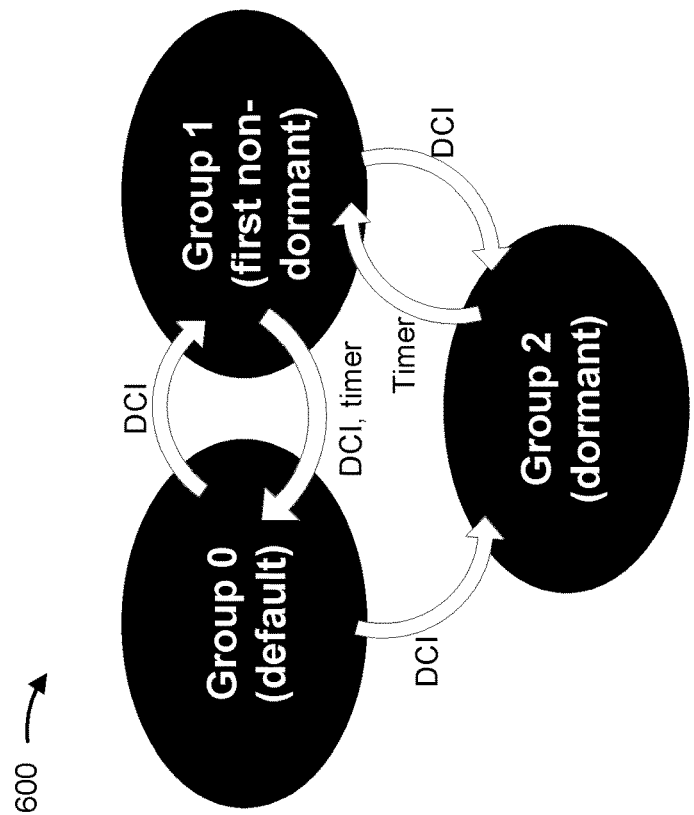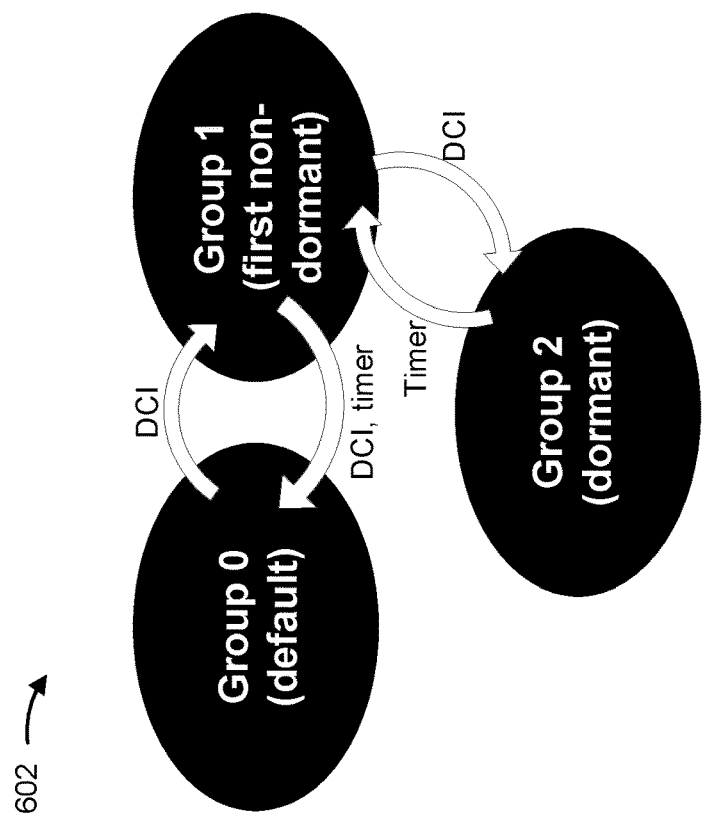
FIG. 6

SEARCH SPACE SET GROUP SWITCHING FOR MONITORING DORMANCY

CROSS-REFERENCE TO RELATED APPLICATIONS

This patent application claims priority to U.S. Provisional Patent Application No. 63/198,806, filed on Nov. 13, 2020, entitled "SEARCH SPACE SET GROUP SWITCHING FOR MONITORING DORMANCY," U.S. Provisional Patent Application No. 63/202,826, filed on Jun. 25, 2021, entitled "SEARCH SPACE SET GROUP SWITCHING FOR MONITORING DORMANCY," and U.S. Provisional Patent Application No. 63/138,739, filed on Jan. 18, 2021, entitled "TECHNIQUES FOR PDCCH SKIPPING BASED ON PDCCH SEARCH SPACE SET GROUP SWITCHING," each of which is assigned to the assignee hereof. The disclosures of the prior applications are considered part of and are incorporated by reference into this patent application.

FIELD OF THE DISCLOSURE

Aspects of the present disclosure generally relate to wireless communication and to techniques and apparatuses for switching search space set groups for monitoring dormancy.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes switching from a first group of search space sets for monitoring a physical downlink control channel (PDCCH) to a dormant group of search space sets in a first carrier, and refraining from monitoring the PDCCH based at least in part on switching to the dormant group.

In some aspects, a method of wireless communication performed by a base station includes determining that a UE is to switch from a first group of search space sets for monitoring a PDCCH to a dormant group of search space sets in a first carrier, and transmitting, to the UE, an indication to switch to the dormant group such that the UE refrains from monitoring the PDCCH based at least in part on switching to the dormant group.

In some aspects, a method of wireless communication performed by a UE includes switching from a first group of search space sets for monitoring a PDCCH to a first non-dormant group of search space sets in a first carrier. The UE may be restricted from switching from the first group to a dormant group of search space sets in the first carrier. The method may include switching from the first non-dormant group to the dormant group and refraining from monitoring the PDCCH based at least in part on switching to the dormant group.

In some aspects, a UE for wireless communication includes a memory and one or more processors coupled to the memory, the one or more processors configured to switch from a first group of search space sets for monitoring a PDCCH to a dormant group of search space sets in a first carrier, and refrain from monitoring the PDCCH based at least in part on switching to the dormant group.

In some aspects, a base station for wireless communication includes a memory and one or more processors coupled to the memory, the one or more processors configured to determine that a UE is to switch from a first group of search space sets for monitoring a PDCCH to a dormant group of search space sets in a first carrier, and transmit, to the UE, an indication to switch to the dormant group such that the UE refrains from monitoring the PDCCH based at least in part on switching to the dormant group.

In some aspects, a UE for wireless communication includes a memory and one or more processors coupled to the memory, the one or more processors configured to switch from a first group of search space sets for monitoring a PDCCH to a first non-dormant group of search space sets in a first carrier. The UE may be restricted from switching from the first group to a dormant group of search space sets in the first carrier. The one or more processors may be configured to switch from the first non-dormant group to the dormant group and refrain from monitoring the PDCCH based at least in part on switching to the dormant group.

In some aspects, a non-transitory computer-readable medium storing a set of instructions for wireless communication includes one or more instructions that, when executed by one or more processors of a UE, cause the UE to switch from a first group of search space sets for monitoring a PDCCH to a dormant group of search space sets in a first carrier, and refrain from monitoring the PDCCH based at least in part on switching to the dormant group.

In some aspects, a non-transitory computer-readable medium storing a set of instructions for wireless communication includes one or more instructions that, when executed by one or more processors of a base station, cause the base station to determine that a UE is to switch from a first group of search space sets for monitoring a PDCCH to a dormant group of search space sets in a first carrier, and transmit, to the UE, an indication to switch to the dormant group such that the UE refrains from monitoring the PDCCH based at least in part on switching to the dormant group.

In some aspects, a non-transitory computer-readable medium storing a set of instructions for wireless communication includes one or more instructions that, when executed by one or more processors of a UE, cause the UE to switch from a first group of search space sets for monitoring a PDCCH to a first non-dormant group of search space sets in a first carrier, where the UE is restricted from switching from the first group to a dormant group of search space sets in the first carrier, switch from the first non-dormant group to the dormant group, and refrain from monitoring the PDCCH based at least in part on switching to the dormant group.

In some aspects, an apparatus for wireless communication includes means for switching from a first group of search space sets for monitoring a PDCCH to a dormant group of search space sets in a first carrier, and means for refraining from monitoring the PDCCH based at least in part on switching to the dormant group.

In some aspects, an apparatus for wireless communication includes means for determining that a UE is to switch from a first group of search space sets for monitoring a PDCCH to a dormant group of search space sets in a first carrier, and means for transmitting, to the UE, an indication to switch to the dormant group such that the UE refrains from monitoring the PDCCH based at least in part on switching to the dormant group.

In some aspects, an apparatus for wireless communication includes means for switching from a first group of search space sets for monitoring a PDCCH to a first non-dormant group of search space sets in a first carrier, where the apparatus is restricted from switching from the first group to a dormant group of search space sets in the first carrier, switching from the first non-dormant group to the dormant group, and refraining from monitoring the PDCCH based at least in part on switching to the dormant group.

In some aspects, a method for wireless communication performed by a UE includes receiving configuration information that includes information that identifies one or more dormant groups of physical downlink control channel (PDCCH) search space sets. The method may include switching from a first group of PDCCH search space sets to at least one dormant group of PDCCH search space sets of the identified one or more dormant groups of PDCCH search space sets. The method may include processing one or more PDCCH search space sets of the at least one dormant group of PDCCH search space sets based at least in part on the received configuration information.

In some aspects, an apparatus configured for wireless communication includes means for receiving configuration information that includes information that identifies one or more dormant groups of PDCCH search space sets. The apparatus may include means for switching from a first group of PDCCH search space sets to at least one dormant group of PDCCH search space sets of the identified one or more dormant groups of PDCCH search space sets. The apparatus may include means for processing one or more PDCCH search space sets of the at least one dormant group of PDCCH search space sets based at least in part on the received configuration information.

In some aspects, a non-transitory computer-readable medium storing a set of instructions for wireless communication includes one or more instructions that, when executed by one or more processors of a UE, cause the UE to receive configuration information that includes information that identifies one or more dormant groups of PDCCH search space sets. The instructions, when executed by the one or more processors of the UE, cause the UE to switch from a first group of PDCCH search space sets to at least one dormant group of PDCCH search space sets of the identified one or more dormant groups of PDCCH search space sets. The instructions, when executed by the one or more processors of the UE, cause the UE to process one or more PDCCH search space sets of the at least one dormant group of PDCCH search space sets based at least in part on the received configuration information.

In some aspects, a UE for wireless communication includes a memory and one or more processors coupled to the memory, the one or more processors configured to receive configuration information that includes information that identifies one or more dormant groups of PDCCH search space sets. The one or more processors may be configured to switch from a first group of PDCCH search space sets to at least one dormant group of PDCCH search space sets of the identified one or more dormant groups of PDCCH search space sets. The one or more processors may be configured to cause the UE to process one or more PDCCH search space sets of the at least one dormant group of PDCCH search space sets based at least in part on the received configuration information.

In some aspects, a method for wireless communication performed by a base station includes transmitting configuration information that includes information that identifies one or more dormant groups of PDCCH search space sets that include one or more PDCCH search space sets to be processed based at least in part on the received configuration information. The method may include transmitting an indication to switch from a first group of PDCCH search space sets to at least one dormant group of PDCCH search space sets of the identified one or more dormant groups of PDCCH search space sets, where the at least one dormant group of PDCCH search space sets includes the one or more PDCCH search space sets.

In some aspects, an apparatus configured for wireless communication includes means for transmitting configuration information that includes information that identifies one or more dormant groups of PDCCH search space sets that include one or more PDCCH search space sets to be processed based at least in part on the received configuration information. The apparatus may include means for transmitting an indication to switch from a first group of PDCCH search space sets to at least one dormant group of PDCCH search space sets of the identified one or more dormant groups of PDCCH search space sets, where the at least one dormant group of PDCCH search space sets includes the one or more PDCCH search space sets.

In some aspects, a non-transitory computer-readable medium storing a set of instructions for wireless communication includes one or more instructions that, when executed by one or more processors of a base station, cause the base station to transmit configuration information that includes information that identifies one or more dormant groups of PDCCH search space sets that include one or more PDCCH search space sets to be processed based at least in part on the received configuration information. The instructions, when executed by the one or more processors of the base station, cause the base station to transmit an indication to switch from a first group of PDCCH search space sets to at least one dormant group of PDCCH search space sets of the identified one or more dormant groups of PDCCH search space sets, where the at least one dormant group of PDCCH search space sets includes the one or more PDCCH search space sets.

In some aspects, a base station configured for wireless communication includes a memory and one or more processors coupled to the memory, the one or more processors configured to transmit configuration information that includes information that identifies one or more dormant groups of PDCCH search space sets that include one or more PDCCH search space sets to be processed. The one or more processors may be configured to transmit an indication to switch from a first group of PDCCH search space sets to at least one dormant group of PDCCH search space sets of the identified one or more dormant groups of PDCCH search space sets, where the at least one dormant group of PDCCH search space sets includes the one or more PDCCH search space sets.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating examples of switching between multiple groups of search space sets, in accordance with the present disclosure.

DETAILED DESCRIPTION

Figure 1:
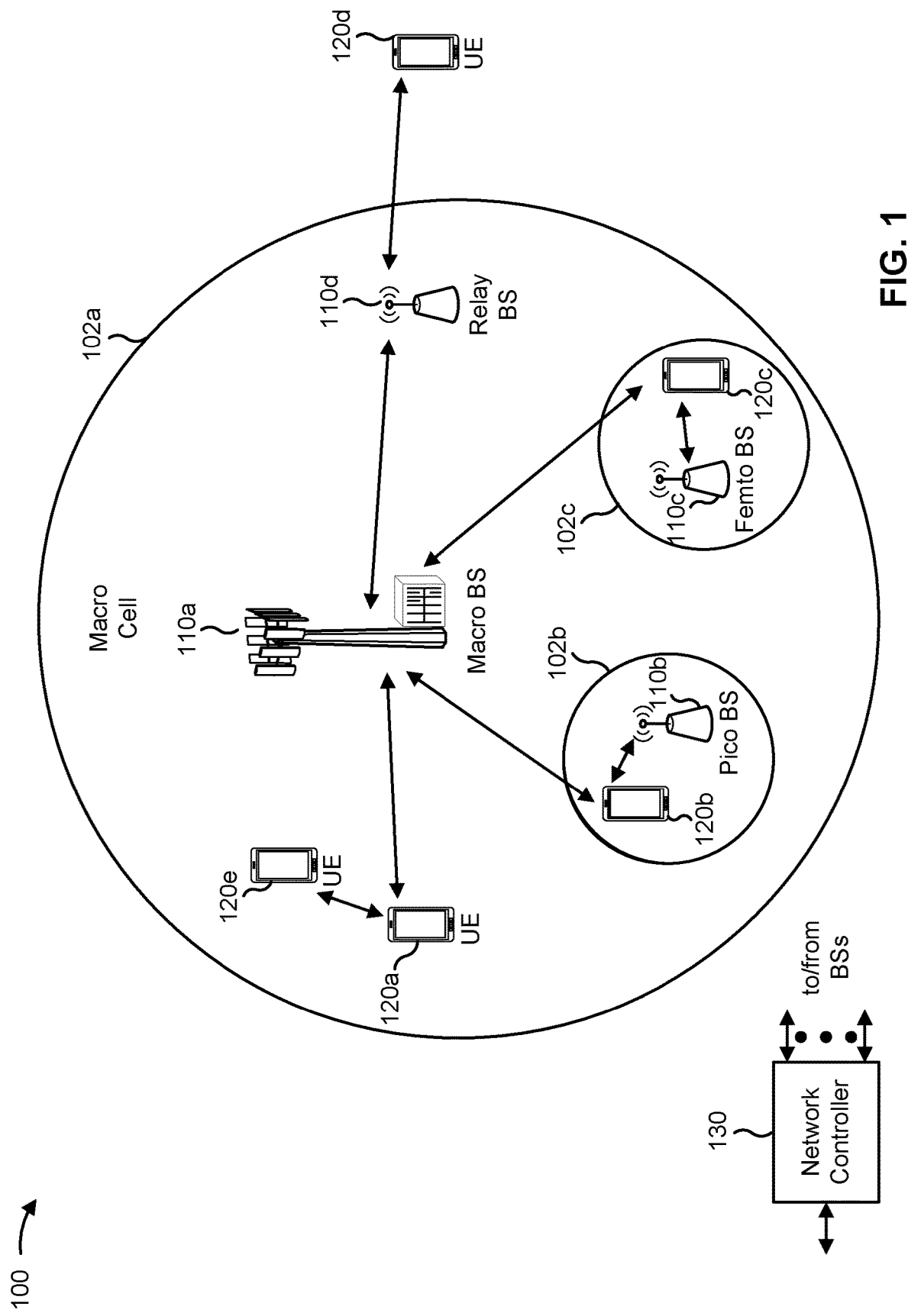
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G) or to other networks such as a code division multiple access (CDMA) network, a time division multiple access (TDMA) network, a frequency division multiple access (FDMA) network, an orthogonal FDMA (OFDMA) network, a single-carrier FDMA (SC-FDMA) network, an LTE network, or a GSM network.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRA networks (UTRANs) in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of a universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification.

3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTIs for diverse latency and quality of service (QoS) requirements. For example, shorter TTIs may be used for low latency and high reliability, while longer TTIs may be used for higher spectral efficiency. The efficient multiplexing of long and short TTI is to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum and supports adaptive uplink or downlink that may be flexibly configured on a per-cell basis to dynamically switch between uplink and downlink to meet current traffic needs.

As indicated above, FIG. 1 is provided as an example. Other examples may differ from what is described with regard to FIG. 1.

Figure 2:
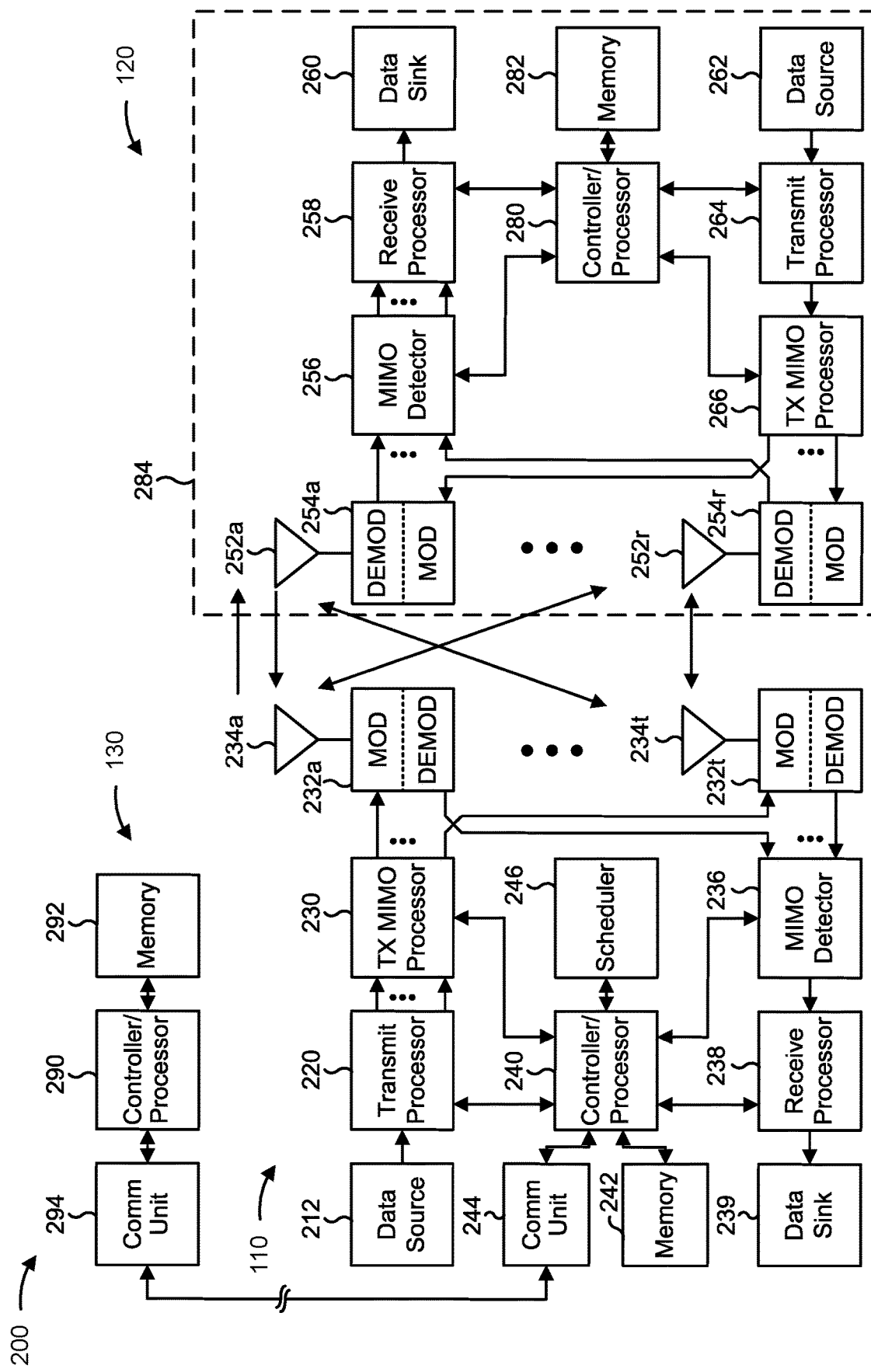
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-18).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-18).

Controller/processor 240 of base station 110, controller/processor 280 of UE 120, and/or any other component(s) of FIG. 2 may perform one or more techniques associated with switching search space set groups for monitoring dormancy, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 1100 of FIG. 11, process 1300 of FIG. 13, process 1400 of FIG. 14, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 1100 of FIG. 11, process 1300 of FIG. 13, process 1400 of FIG. 14, and/or other processes as described herein. In some aspects, executing instructions may include running the instructions, converting the instructions, compiling the instructions, and/or interpreting the instructions, among other examples.

In some aspects, UE 120 includes means for switching from a first group of search space sets for monitoring a physical downlink control channel (PDCCH) to a dormant group of search space sets in a first carrier, and/or means for refraining from monitoring the PDCCH based at least in part on switching to the dormant group. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, UE 120 includes means for receiving a switching rule for switching to the dormant group, where switching to the dormant group includes switching to the dormant group based at least in part on determining that one or more conditions satisfy the switching rule.

In some aspects, UE 120 includes means for switching from the dormant group to a non-dormant group based at least in part on receiving an indication to switch to the non-dormant group.

In some aspects, UE 120 includes means for switching from the dormant group to a non-dormant group in the first carrier based at least in part on expiration of a dormancy timer.

In some aspects, UE 120 includes means for switching from the dormant group to a non-dormant group based at least in part on determining that communication activity in the first carrier satisfies an activity threshold, where the non-dormant group is one of a designated search space set group, a previous search space set group, or a default search space set group.

In some aspects, base station 110 includes means for determining that a UE is to switch from a first group of search space sets for monitoring a PDCCH to a dormant group of search space sets in a first carrier, and/or means for transmitting, to the UE, an indication to switch to the dormant group such that the UE refrains from monitoring the PDCCH based at least in part on switching to the dormant group. The means for base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, base station 110 includes means for transmitting, to the UE, a configuration that specifies that the UE is to switch to the dormant group based at least in part on determining that inactivity on the PDCCH satisfies an inactivity threshold.

In some aspects, base station 110 includes means for transmitting, to the UE, a switching rule for switching to the dormant group, where the switching rule specifies that the UE is to switch to the dormant group based at least in part on determining that one or more conditions satisfy the switching rule.

In some aspects, base station 110 includes means for transmitting, to the UE, an indication to switch from the dormant group to a non-dormant group in the first carrier.

In some aspects, base station 110 includes means for transmitting, to the UE, a value for a dormancy timer, where the UE is to switch from the dormant group to a non-dormant group based at least in part on expiration of the dormancy timer.

In some aspects, UE 120 includes means for switching from a first group of search space sets for monitoring a PDCCH to a first non-dormant group of search space sets in a first carrier, where the UE is restricted from switching from the first group to a dormant group of search space sets in the first carrier, means for switching from the first non-dormant group to the dormant group, and/or means for refraining from monitoring the PDCCH based at least in part on switching to the dormant group. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, UE 120 includes means for receiving configuration information that includes information that identifies one or more dormant groups of PDCCH search space sets, means for switching from a first group of PDCCH search space sets to at least one dormant group of PDCCH search space sets of the identified one or more dormant groups of PDCCH search space sets, and/or means for processing one or more PDCCH search space sets of the at least one dormant group of PDCCH search space sets based at least in part on the received configuration information.

In some aspects, base station 110 includes means for transmitting configuration information that includes information that identifies one or more dormant groups of PDCCH search space sets that include one or more PDCCH search space sets to be processed based at least in part on the received configuration information and means for transmitting an indication to switch from a first group of PDCCH search space sets to at least one dormant group of PDCCH search space sets of the identified one or more dormant groups of PDCCH search space sets, where the at least one dormant group of PDCCH search space sets includes the one or more PDCCH search space sets.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
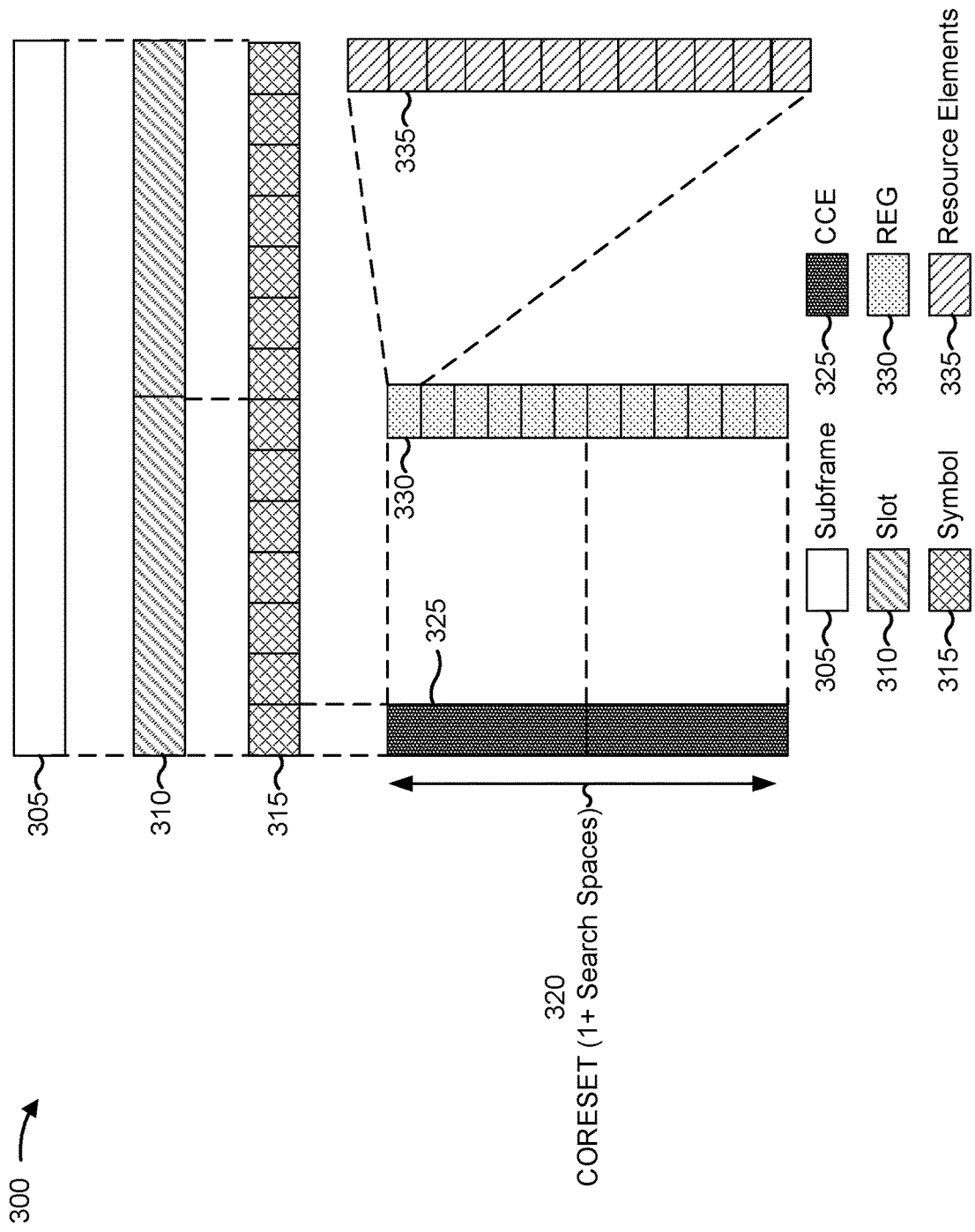
FIG. 3 is a diagram illustrating an example resource structure for wireless communication, in accordance with the present disclosure.

FIG. 3 is a diagram illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots). In some aspects, different types of transmission time intervals (TTIs) may be used, other than subframes and/or slots. A slot 310 may include multiple symbols 315, such as 14 symbols per slot.

The potential control region of a slot 310 may be referred to as a control resource set (CORESET) 320 and may be structured to support an efficient use of resources, such as by flexible configuration or reconfiguration of resources of the CORESET 320 for one or more physical downlink control channels (PDCCHs) and/or one or more physical downlink shared channels (PDSCHs). In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level (AL) used by the BS for the transmission of DCI. In FIG. 3, an aggregation level of two is shown as an example, corresponding to two CCEs 325 in a slot 310. In some aspects, different aggregation levels may be used, such as 1, 2, 4, 8, 16, and/or the like.

Each CCE 325 may include a fixed quantity of resource element groups (REGs) 330, shown as 6 REGs 330, or may include a variable quantity of REGs 330. In some aspects, the quantity of REGs 330 included in a CCE 325 may be specified by a REG bundle size. A REG 330 may include one resource block, which may include 12 resource elements (REs) 335 within a symbol 315. A resource element 335 may occupy one subcarrier in the frequency domain and one OFDM symbol in the time domain.

A search space may include all possible locations (e.g., in time and/or frequency) where a PDCCH may be located. A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs), an aggregation level being used, and/or the like. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space set. A UE may monitor the PDCCH in a group of search space sets.

As indicated above, FIG. 3 is provided as an example. Other examples may differ from what is described with respect to FIG. 3.

Figure 4:
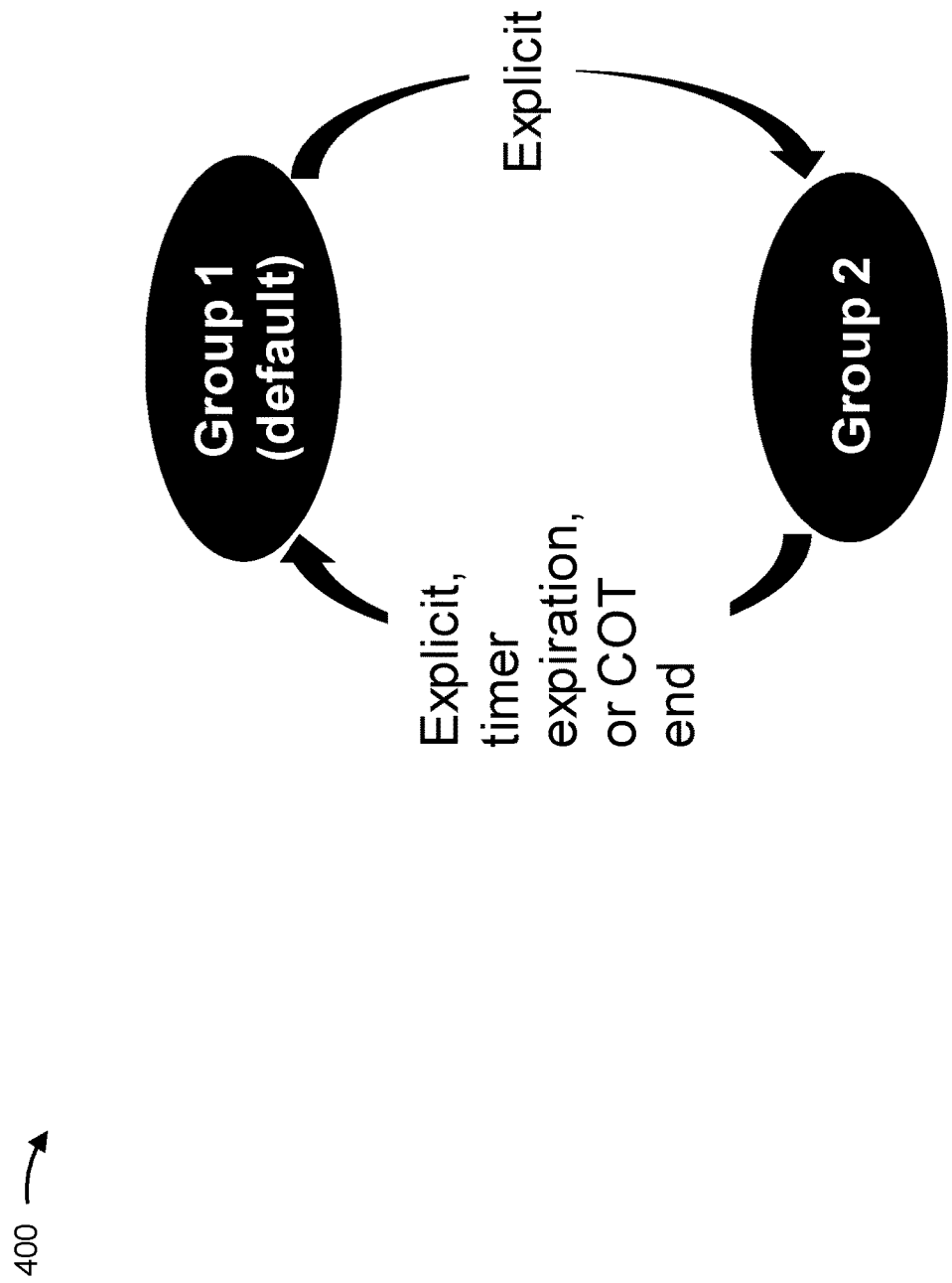
FIG. 4 is a diagram illustrating an example of dynamic switching between groups of search space sets, in accordance with the present disclosure.

FIG. 4 is a diagram illustrating an example 400 of dynamic switching between groups of search space sets, in accordance with the present disclosure.

A UE may dynamically switch groups of search space sets to access a channel promptly in an unlicensed band and to save power in a licensed band. For example, the UE may monitor a PDCCH in a first group. The first group may be a default group (e.g., Group 1 of example 400) that the UE monitors if no group is specifically indicated. The default group may be the group that the UE monitors upon expiration of a timer for monitoring another group. In an unlicensed band, the default group may be the group that the UE monitors outside a channel occupancy time (COT). In an unlicensed band, the default group may involve frequent PDCCH monitoring, such as one or more monitoring occasions per slot, where each occasion may be, for example, two symbols. Frequent PDCCH monitoring provides more transmission opportunities after the channel access through a listen before talk (LBT) procedure, which reduces the risk of losing the medium by another contending transmitter node. In a licensed band, the default group may involve less frequent PDCCH monitoring, such as monitoring every n quantity of slots, or less than one monitoring occasion per slot. The UE may reduce power consumption with less frequent PDCCH monitoring.

Group 2 in example 400 may involve less frequent PDCCH monitoring in an unlicensed band and can be used during a COT. On the other hand, Group 2 may involve more frequent PDCCH monitoring in a licensed band for higher performance. Higher performance may include a higher throughput and/or lower latency. For higher performance, the UE may monitor more occasions per slot. The UE may switch to Group 2 if there is more traffic, and remain at or switch to Group 1 is there is little traffic. The UE may switch groups upon an explicit indication in DCI or in a medium access control control element (MAC CE). Dynamic group switching may enable flexibility for handling more traffic and for saving power.

With this flexibility, groups of space search sets may vary. For example, one group may involve less PDCCH monitoring than another group. However, there is no group for no PDCCH monitoring, such that PDCCH monitoring is dormant. In some circumstances, such monitoring dormancy would be appropriate to save more power. One solution for monitoring dormancy may involve skipping PDCCH monitoring for multiple slots, but this solution would use a different mechanism than group switching. Adding a skipping mechanism would increase processing resources of the UE. The skipping mechanism may also involve additional signaling, which would further consume signaling resources.

According to various aspects described herein, a UE may switch to a dormant group of search space sets, where no PDCCH monitoring is to take place. The dormant group may be an empty group or include a dummy search space set. For example, a dummy search space set may have a very high periodicity or an infinite periodicity, such that the UE may never monitor the search space set. The dummy search space set may have zero PDCCH candidates. An empty group may have no search space sets or may be set with an infinite periodicity or zero PDCCH candidates.

The UE may receive an explicit trigger to switch to the dormant group, or the UE may act on an implicit trigger. Switching to the dormant group may enable power saving flexibility while conserving power, processing resources, and signaling resources that would otherwise be consumed by an additional mechanism for skipping PDCCH monitoring.

As indicated above, FIG. 4 is provided as an example. Other examples may differ from what is described with regard to FIG. 4.

Figure 5:
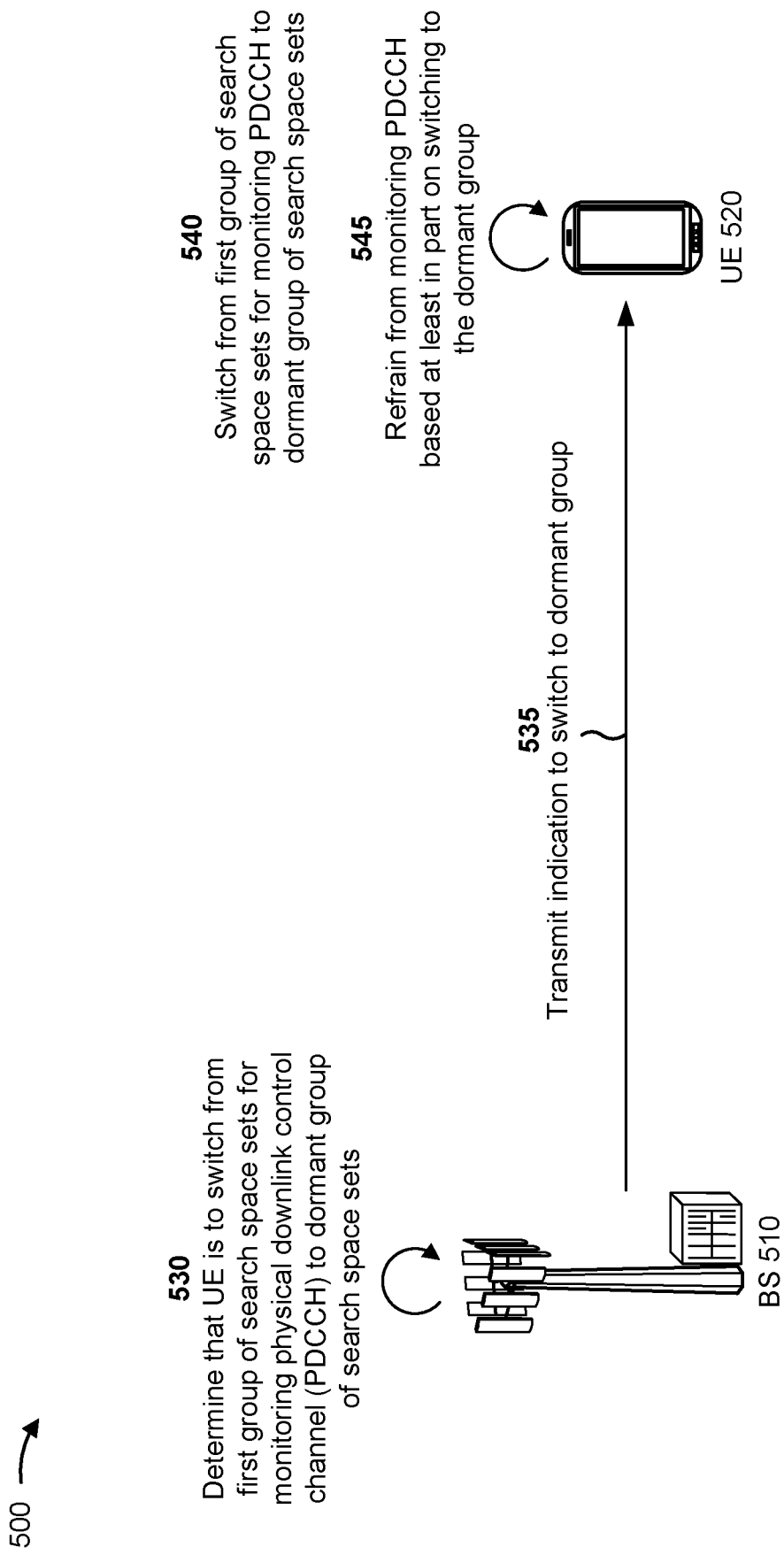
FIG. 5 is a diagram illustrating an example of switching search space set groups for monitoring dormancy, in accordance with the present disclosure.

FIG. 5 is a diagram illustrating an example 500 of switching search space set groups for monitoring dormancy, in accordance with the present disclosure. As shown in FIG. 5, a base station 110 and a UE 120 may communicate with one another on an uplink or a downlink.

BS 510 may determine that UE 520 is to stop monitoring the PDCCH. This may be due to a lack of activity on the PDCCH, a UE capability, traffic conditions, application information, a location of UE 520, and/or other status information for UE 520. As shown by reference number 530, BS 510 may determine that UE 520 is to switch from a first group of search space sets for monitoring the PDCCH to a dormant group of search space sets. The first group may be considered a non-dormant group. The dormant group may be an empty group of search space sets, or may include a dummy search space set. The dummy search space set may have a high (e.g., infinite) periodicity and/or zero PDCCH candidates. The dummy search space set may not be counted in the budget of search space sets, which may be, for example, up to ten search space sets per bandwidth part. There may be multiple dormant groups and/or multiple non-dormant groups.

As shown by reference number 535, BS 510 may transmit an indication to switch from the first group to the dormant group for no PDCCH monitoring. For example, BS 510 may transmit a switch indication in DCI format 2_0 (slot format indication (SLI)), DCI format 2_6 (wake up signal (WUS)) or DCI with a cyclic redundancy check scrambled by a power saving radio network temporary identifier (DCP)), a non-fallback DCI format (e.g., 0_1, 0_2, 1_1, and 1_2), or a new dedicated DCI format. The switch indication may be a value in a search space set group indication field in DCI. BS 510 may also transmit the switch indication in a MAC CE. The indication may be an index of the dormant group, an inactivity timer value or another value specific to dynamic group switching.

In some aspects, UE 520 may switch from the first group to the dormant group only if the first group is from one or more designated non-dormant groups. For example, UE 520 may receive an indication to switch to the dormant group only in a designated non-dormant group.

Alternatively, in some aspects, UE 520 is configured with the first group (default group) and a first non-dormant group. While both the first group and the first-non-dormant group may be non-dormant groups, the first non-dormant group is labeled as such to distinguish a non-dormant group from which UE 520 may switch to a dormant group. That is, UE 520 may be restricted from switching from the first group to the dormant group. Rather, UE 520 switches from the first group to the first non-dormant group and then switches from the first non-dormant group to the dormant group. This alternative is described in connection with FIG. 6.

Alternatively, or additionally, in some aspects, BS 510 may configure UE 520 to act on an implicit trigger. For example, BS 510 may configure UE 520 to switch to the dormant group based at least in part on detecting that there is little or no activity on the PDCCH. For example, UE 520 may switch to the dormant group if PDCCH activity (e.g., amount of traffic, frequency of traffic) satisfies an activity threshold (e.g., minimum activity threshold). In some aspects, BS 510 may configure UE 520 with one or more switching rules. UE 520 may switch groups based at least in part on one or more conditions satisfying a switching rule. The conditions may include traffic activity, a power status of UE 520, a traffic type, information associated with an application, a location of UE 520, a history or status of other groups, and/or conditions on the PDCCH. A switching rule may be oriented toward power saving or toward higher performance.

In some aspects, UE 520 may switch to the dormant group if a timer expires. For example, UE 520 may switch to the dormant group if inactivity on the PDCCH exceeds a duration of the timer, or if a time duration between periods of activity satisfies a duration threshold. In some aspects, the UE 520 may switch to a dormant group after a COT ends, if UE 520 is operating in an unlicensed band.

As shown by reference number 540, UE 520 may switch from the first group to the dormant group. Accordingly, UE 520 may refrain from monitoring PDCCH based at least in part on switching to the dormant group, as shown by reference number 545. In this way, UE 520 may save power while using a more typical group-switching mechanism.

As indicated above, FIG. 5 is provided as an example. Other examples may differ from what is described with respect to FIG. 5.

FIG. 6 is a diagram illustrating examples 600, 602 of switching between multiple groups of search space sets, in accordance with the present disclosure.

Example 600 shows a default group (Group 0), a first non-dormant group (Group 1), and a dormant group (Group 2). A UE may switch, by an indication in DCI, from Group 0 to Group 1, where both groups are non-dormant. The UE may switch by DCI, a MAC CE, or an implicit trigger to Group 2, which is a dormant group.

In some aspects, the UE may switch out of the dormant group to a non-dormant group. A group, such as Group 1 in example 600, may be designated as a first non-dormant group to which the UE may switch. If a first non-dormant group is not designated, the UE may switch to a previous group or the default group, such as Group 0.

In some aspects, the UE may switch out of the dormant group by an explicit trigger. Because the UE is not monitoring the PDCCH while dormant, the explicit trigger may be an indication in a MAC CE. The MAC CE may be received on semi-persistent scheduling (SPS) resources in the same carrier, if SPS is configured. If carrier aggregation is configured, the UE may receive an indication in a MAC CE or a search space set group indication field in DCI on a different carrier. For example, the UE may receive a cross-carrier search space set group indication. The indication may be specific to one carrier or may apply to multiple carriers.

In some aspects, the UE may receive the indication to switch to a non-dormant group (e.g., first non-dormant group) in a value of a field in DCI, where the DCI is in a common search space set that is monitored independently of whether the UE is in a dormant group or a non-dormant group. For example, if the UE selected the dormant group and switched to the dormant group, the UE may still monitor the common search space set even if the UE is in the dormant group. In other words, the UE is not otherwise monitoring the PDCCH, but may still receive an indication to switch to a non-dormant group.

Alternatively, or additionally, in some aspects, the UE may switch from the dormant group to a non-dormant group (e.g., first non-dormant group) based at least in part on an implicit trigger. The implicit trigger may be a dormancy timer. For example, the UE may be configured, via an RRC message, with a dormancy timer value. The UE may switch from the dormant group to a non-dormant group upon expiration of the dormancy timer. The UE may receive a dormancy timer value in a configuration message or in the indication to switch to the dormant group.

The dormancy timer value may be a time duration (e.g., milliseconds) or a quantity of slots. The dormancy timer value may also be a quantity of discontinuous reception (DRX) cycles if DRX is configured, such that the UE remains in the dormant group until a start of a next n-th DRX cycle. Dormancy timer values may vary between dormant groups if there are multiple dormant groups, and a dormancy timer value may be specific to a dormant group.

In some aspects, the implicit trigger may involve sensing communication activity in the carrier. For example, the UE may switch from the dormant group to the non-dormant group if activity detected in the carrier satisfies an activity threshold (e.g., minimum energy, preamble detection). Activity thresholds and sensing occasions may be specified by configuration. By switching to and from a dormant group, the UE may dynamically choose when to save power and when to increase monitoring performance.

Example 602 shows the first group or default group (Group 0), the first non-dormant group (Group 1), and the dormant group (Group 2). Currently, a UE may switch, by an indication in DCI, from Group 0 to either Group 1 or Group 2. In an error case scenario, the UE may not receive or may mis-detect DCI from the base station that indicates a switch from Group 0 to Group 2, and the UE may remain with Group 0. The base station may expect that the UE switched from Group 2 to Group 1 by expiration of a timer, but the UE will be in Group 0 and not Group 1. There will be some ambiguity between the base station and the UE as to whether the UE is in Group 0 or Group 1. Therefore, in some aspects, the UE may switch from Group 1 to Group 2 but may be restricted from switching from Group 0 to Group 2. As shown in example 602, there is no DCI to indicate a switch from Group 0 to Group 2. That is, if the UE is configured with a dormant group and a first non-dormant group, the UE may be restricted to switching to the dormant group only from the first non-dormant group.

By restricting the switch from Group 0 to Group 2, the UE and the base station may conserve signaling resources that would otherwise be wasted by a continued lack of group synchronization between the UE and the BS. For example, the UE may switch from Group 0 to Group 1, and from Group 1 to Group 2. The UE may then switch from Group 2 to Group 1 by expiration of a timer. On the other hand, if the UE is in Group 1 but misses DCI indicating a switch from Group 1 to Group 2, the UE may remain in Group 1. Eventually, the UE and the base station may be aligned with expectations that the UE is in Group 1. Any confusion as to whether the UE is in Group 0 or Group 2 is eliminated. In other words, by removing an indication to switch from Group 0 to Group 2, the UE and the base station may realign group expectations sooner if the UE misses DCI indicating a switch.

As indicated above, FIG. 6 is provided as an example. Other examples may differ from what is described with regard to FIG. 6.

Figure 7:
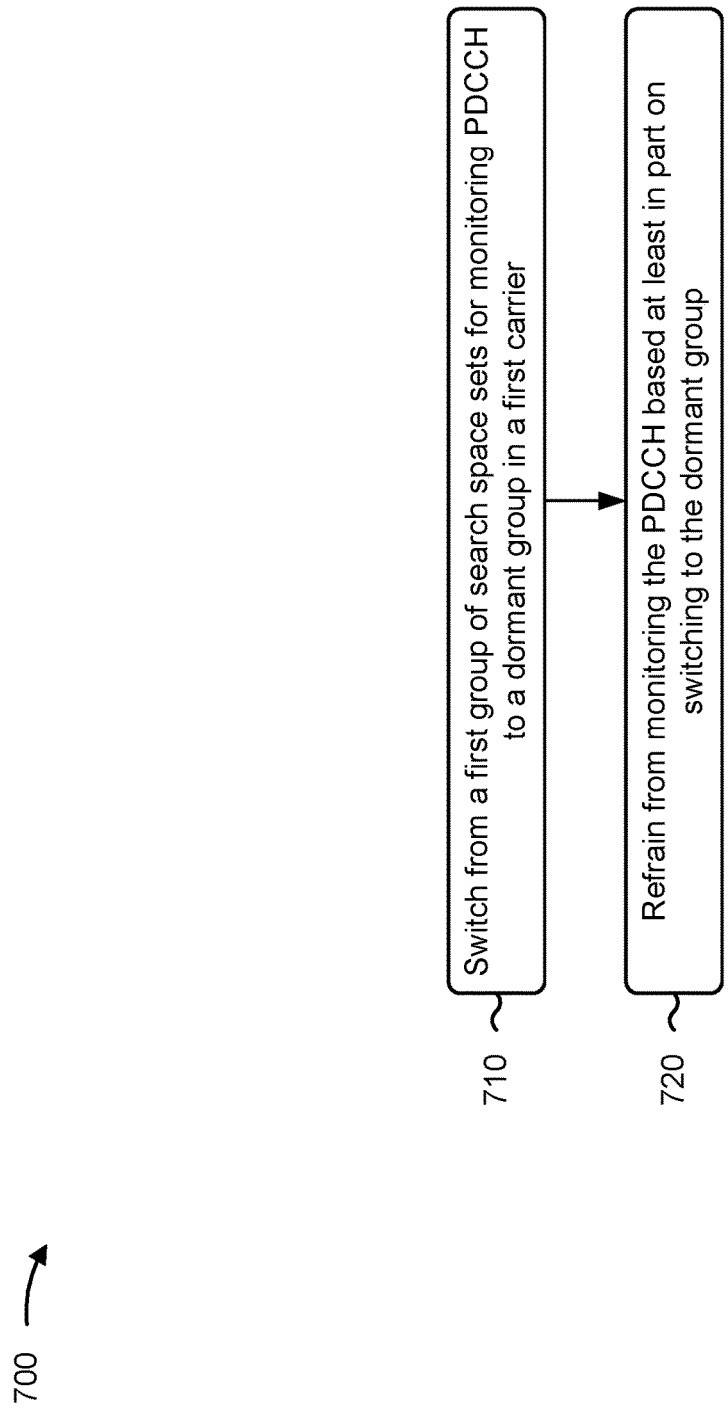
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120 depicted in FIGS. 1-2, UE 520 depicted in FIG. 5) performs operations associated with switching search space set groups for monitoring dormancy.

As shown in FIG. 7, in some aspects, process 700 may include switching from a first group of search space sets for monitoring a PDCCH to a dormant group of search space sets in a first carrier (block 710). For example, the UE (e.g., using monitoring component 908 depicted in FIG. 9) may switch from a first group of search space sets for monitoring a PDCCH to a dormant group of search space sets in a first carrier, as described above.

As further shown in FIG. 7, in some aspects, process 700 may include refraining from monitoring the PDCCH based at least in part on switching to the dormant group (block 720). For example, the UE (e.g., using monitoring component 908 depicted in FIG. 9) may refrain from monitoring the PDCCH based at least in part on switching to the dormant group, as described above.

Process 700 may include additional aspects, such as any single aspect or any combination of aspects described below and/or in connection with one or more other processes described elsewhere herein.

In a first aspect, the dormant group is an empty group with no search space sets.

In a second aspect, alone or in combination with the first aspect, the dormant group includes a dummy search space set with one of an infinite periodicity or zero PDCCH candidates.

In a third aspect, alone or in combination with one or more of the first and second aspects, switching to the dormant group includes switching to the dormant group based at least in part on receiving an indication to switch to the dormant group for no PDCCH monitoring.

In a fourth aspect, alone or in combination with one or more of the first through third aspects, receiving the indication to switch to the dormant group includes receiving a value in a search space set group indication field in DCI.

In a fifth aspect, alone or in combination with one or more of the first through fourth aspects, receiving the indication to switch to the dormant group includes receiving the indication in a MAC CE.

In a sixth aspect, alone or in combination with one or more of the first through fifth aspects, receiving the indication to switch to the dormant group includes receiving the indication only in a designated non-dormant group.

In a seventh aspect, alone or in combination with one or more of the first through sixth aspects, switching to the dormant group includes switching to the dormant group based at least in part on determining that inactivity on the PDCCH satisfies an inactivity threshold.

In an eighth aspect, alone or in combination with one or more of the first through seventh aspects, process 700 includes receiving a switching rule for switching to the dormant group, where switching to the dormant group includes switching to the dormant group based at least in part on determining that one or more conditions satisfy the switching rule.

In a ninth aspect, alone or in combination with one or more of the first through eighth aspects, process 700 includes switching from the dormant group to a non-dormant group in the first carrier based at least in part on receiving an indication to switch to the non-dormant group.

In a tenth aspect, alone or in combination with one or more of the first through ninth aspects, receiving the indication to switch to the non-dormant group includes receiving the indication in a MAC CE on SPS resources.

In an eleventh aspect, alone or in combination with one or more of the first through tenth aspects, receiving the indication to switch to the non-dormant group includes receiving the indication in a field on a particular carrier, other than the first carrier, among multiple carriers.

In a twelfth aspect, alone or in combination with one or more of the first through eleventh aspects, receiving the indication to switch to the non-dormant group includes receiving a value of a field in DCI in a common search space set that is monitored independently of a search space set group selection.

In a thirteenth aspect, alone or in combination with one or more of the first through twelfth aspects, process 700 includes switching from the dormant group to a non-dormant group based at least in part on expiration of a dormancy timer, where the non-dormant group is one of a designated search space set group, a previous search space set group, or a default search space set group.

In a fourteenth aspect, alone or in combination with one or more of the first through thirteenth aspects, the expiration of the dormancy timer is based at least in part on a value for a dormancy timer received in a configuration or the indication to switch to the dormant group.

In a fifteenth aspect, alone or in combination with one or more of the first through fourteenth aspects, the expiration of the dormancy timer is based at least in part on one or more of a time duration, a quantity of slots, or a quantity of DRX cycles.

In a sixteenth aspect, alone or in combination with one or more of the first through fifteenth aspects, process 700 includes switching from the dormant group to a non-dormant group based at least in part on determining that communication activity in the first carrier satisfies an activity threshold.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
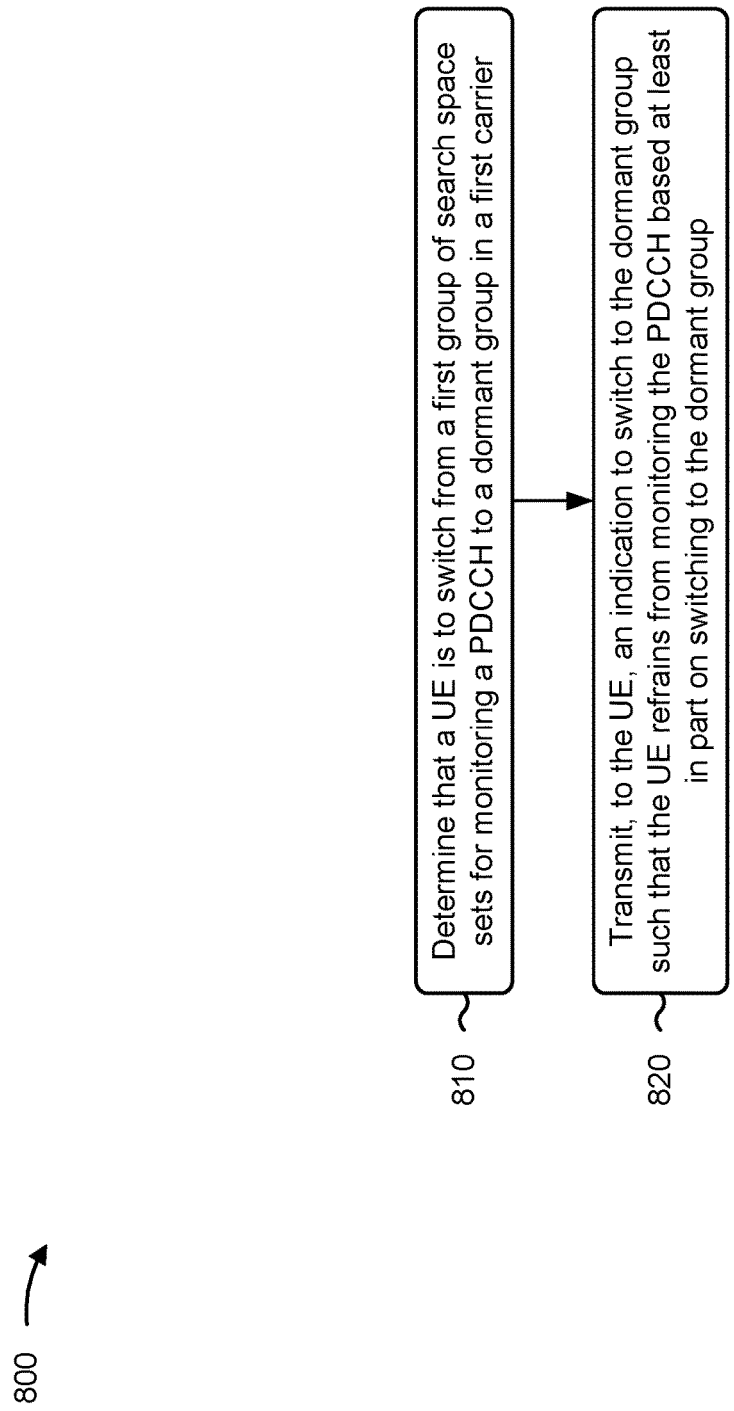
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., base station 110 depicted in FIGS. 1-2, BS 510 depicted in FIG. 5) performs operations associated with switching search space set groups for monitoring dormancy.

As shown in FIG. 8, in some aspects, process 800 may include determining that a UE is to switch from a first group of search space sets for monitoring a PDCCH to a dormant group of search space sets in a first carrier (block 810). For example, the base station (e.g., using determination component 1008 depicted in FIG. 10) may determine that a UE is to switch from a first group of search space sets for monitoring a PDCCH to a dormant group of search space sets in a first carrier, as described above.

As further shown in FIG. 8, in some aspects, process 800 may include transmitting, to the UE, an indication to switch to the dormant group such that the UE refrains from monitoring the PDCCH based at least in part on switching to the dormant group (block 820). For example, the base station (e.g., using transmission component 1004 depicted in FIG. 10) may transmit, to the UE, an indication to switch to the dormant group such that the UE refrains from monitoring the PDCCH based at least in part on switching to the dormant group, as described above.

Process 800 may include additional aspects, such as any single aspect or any combination of aspects described below and/or in connection with one or more other processes described elsewhere herein.

In a first aspect, the dormant group is an empty group with no search space sets.

In a second aspect, alone or in combination with the first aspect, the dormant group includes a dummy search space set with one of an infinite periodicity or zero PDCCH candidates.

In a third aspect, alone or in combination with one or more of the first and second aspects, transmitting the indication to switch to the dormant group includes transmitting a value in a search space set group indication field in DCI.

In a fourth aspect, alone or in combination with one or more of the first through third aspects, transmitting the indication to switch to the dormant group includes transmitting the indication in a MAC CE.

In a fifth aspect, alone or in combination with one or more of the first through fourth aspects, process 800 includes transmitting, to the UE, a configuration that specifies that the UE is to switch to the dormant group based at least in part on determining that inactivity on the PDCCH satisfies an inactivity threshold.

In a sixth aspect, alone or in combination with one or more of the first through fifth aspects, process 800 includes transmitting, to the UE, a switching rule for switching to the dormant group, where the switching rule specifies that the UE is to switch to the dormant group based at least in part on determining that one or more conditions satisfy the switching rule.

In a seventh aspect, alone or in combination with one or more of the first through sixth aspects, process 800 includes transmitting, to the UE, an indication to switch from the dormant group to a non-dormant group in the first carrier.

In an eighth aspect, alone or in combination with one or more of the first through seventh aspects, transmitting the indication to switch to the non-dormant group includes transmitting the indication in a MAC CE on semi-persistent scheduling resources.

In a ninth aspect, alone or in combination with one or more of the first through eighth aspects, transmitting the indication to switch to the non-dormant group includes transmitting the indication in a field on a particular carrier, other than the first carrier, among multiple carriers.

In a tenth aspect, alone or in combination with one or more of the first through ninth aspects, transmitting the indication to switch to the non-dormant group includes transmitting a value of a field in DCI in a common search space set that is monitored independently of a search space set group selection.

In an eleventh aspect, alone or in combination with one or more of the first through tenth aspects, transmitting the indication to switch to the dormant group includes transmitting the indication only in a designated non-dormant group.

In a twelfth aspect, alone or in combination with one or more of the first through eleventh aspects, process 800 includes transmitting, to the UE, a value for a dormancy timer, where the UE is to switch from the dormant group to a non-dormant group based at least in part on expiration of the dormancy timer, and where the non-dormant group is one of a designated search space set group, a previous search space set group, or a default search space set group.

In a thirteenth aspect, alone or in combination with one or more of the first through twelfth aspects, process 800 includes transmitting the value for the dormancy timer in a configuration or the indication to switch to the dormant group.

In a fourteenth aspect, alone or in combination with one or more of the first through thirteenth aspects, the expiration of the dormancy timer is based at least in part on one or more of a time duration, a quantity of slots, or a quantity of DRX cycles.

In a fifteenth aspect, alone or in combination with one or more of the first through fourteenth aspects, the value of the dormancy timer is specific to the dormant group.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
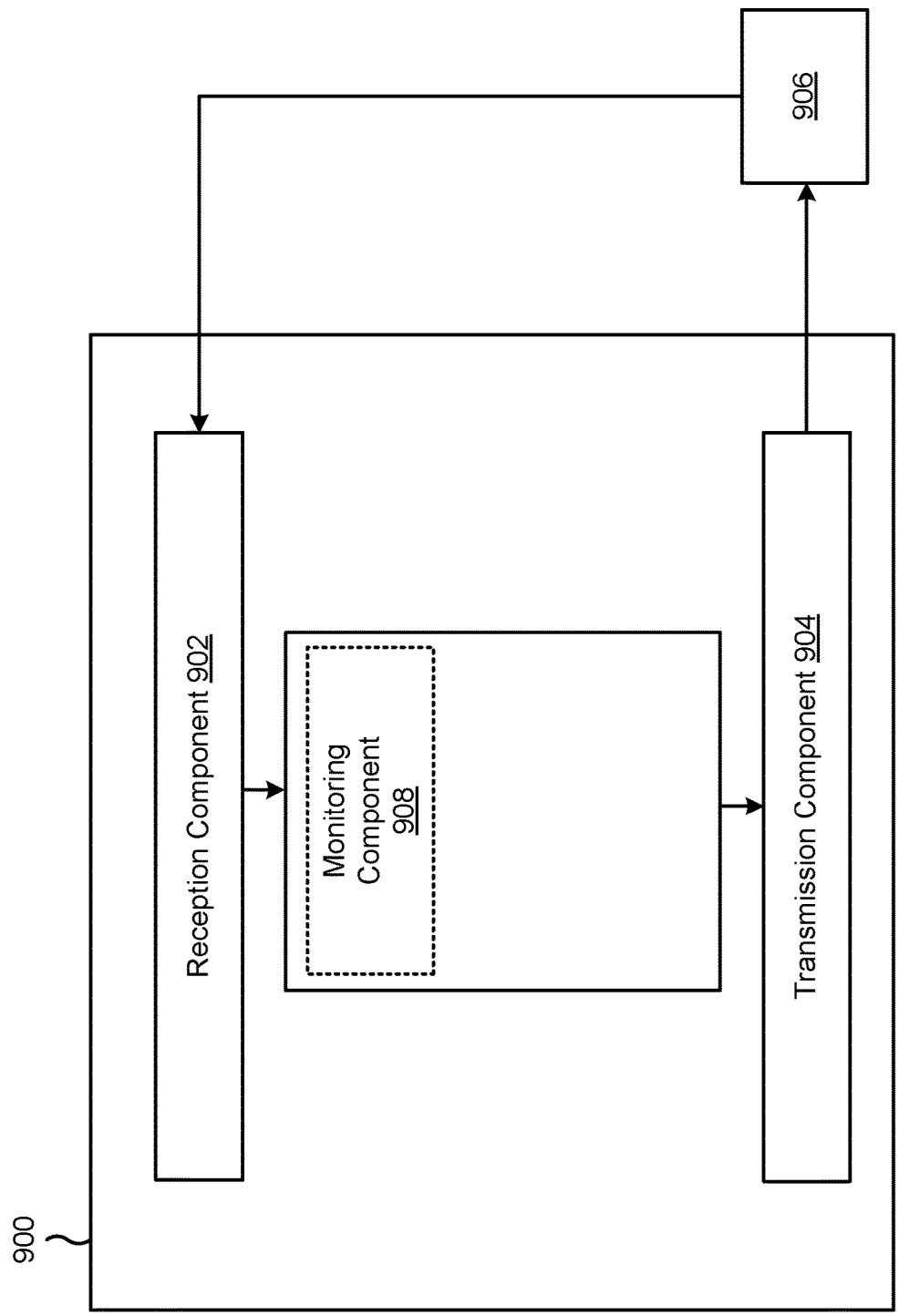
FIGS. 9-10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a monitoring component 908, among other examples.

In some aspects, the apparatus 900 may be configured to perform one or more operations described herein in connection with FIGS. 1-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The monitoring component 908 may switch from a first group of search space sets for monitoring a PDCCH to a dormant group of search space sets. The monitoring component 908 may refrain from monitoring the PDCCH based at least in part on switching to the dormant group.

The reception component 902 may receive a switching rule for switching to the dormant group, where switching to the dormant group includes switching to the dormant group based at least in part on determining that one or more conditions satisfy the switching rule.

The monitoring component 908 may switch from the dormant group to a non-dormant group in the first carrier based at least in part on receiving an indication to switch to the non-dormant group. In some aspects, the monitoring component 908 may switch from the first group to the dormant group only if the first group is from one or more designated non-dormant groups. For example, the monitoring component 908 may receive an indication to switch to the dormant group only in a designated non-dormant group.

The monitoring component 908 may switch from the dormant group to a non-dormant group based at least in part on expiration of a dormancy timer, where the non-dormant group is one of a designated search space set group, a previous search space set group, or a default search space set group.

The monitoring component 908 may switch from the dormant group to a non-dormant group based at least in part on determining that communication activity in the first carrier satisfies an activity threshold.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
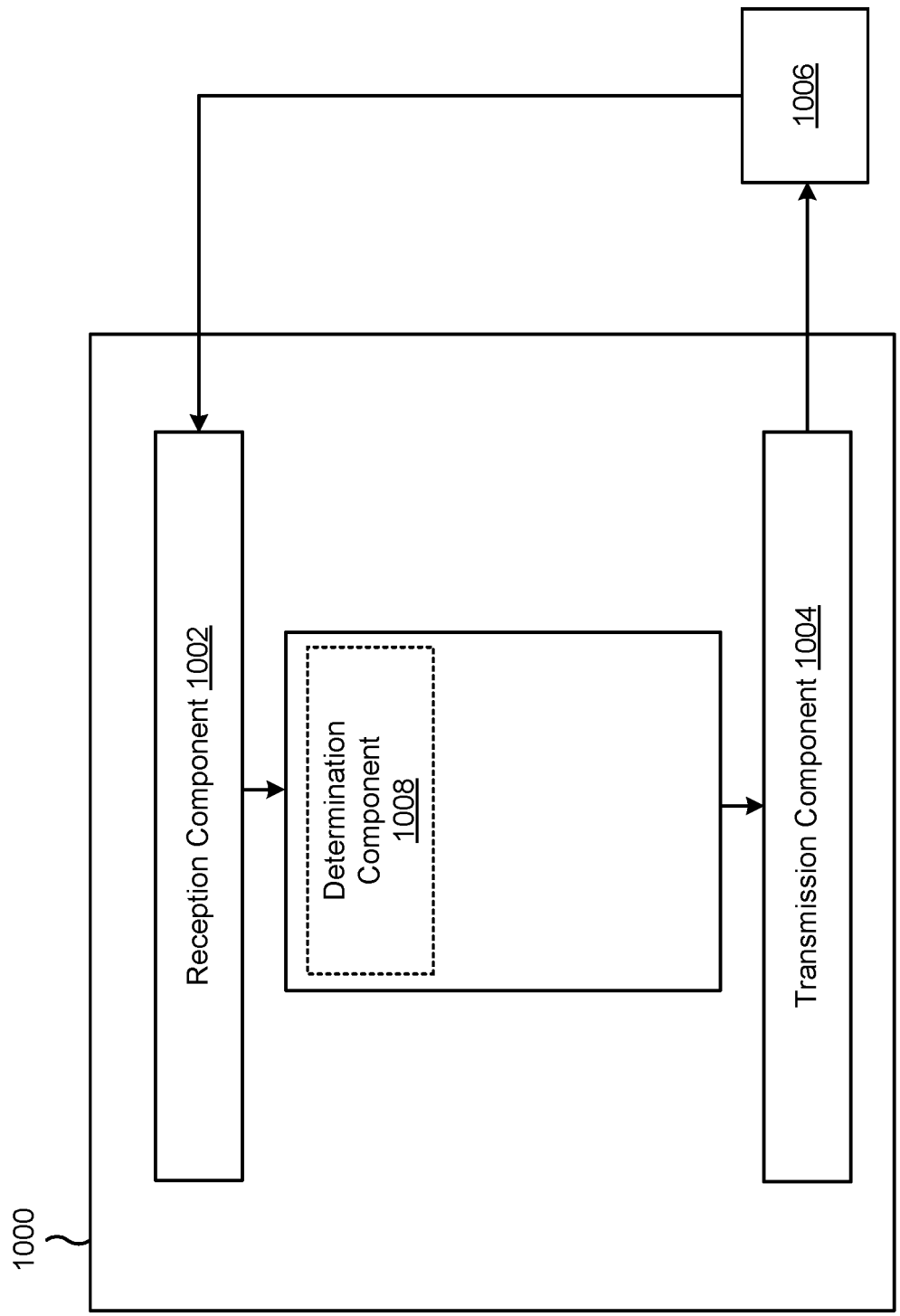

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIGS. 1-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The determination component 1008 may determine that a UE is to switch from a first group of search space sets for monitoring a PDCCH to a dormant group of search space sets in a first carrier. The transmission component 1004 may transmit, to the UE, an indication to switch to the dormant group such that the UE refrains from monitoring the PDCCH based at least in part on switching to the dormant group.

The transmission component 1004 may transmit, to the UE, a configuration that specifies that the UE is to switch to the dormant group based at least in part on determining that communication inactivity in the first carrier satisfies an inactivity threshold.

The transmission component 1004 may transmit, to the UE, a switching rule for switching to the dormant group, where the switching rule specifies that the UE is to switch to the dormant group based at least in part on determining that one or more conditions satisfy the switching rule.

The transmission component 1004 may transmit, to the UE, an indication to switch from the dormant group to a non-dormant group.

The transmission component 1004 may transmit, to the UE, a value for a dormancy timer, where the UE is to switch from the dormant group to a non-dormant group based at least in part on expiration of the dormancy timer, and where the non-dormant group is one of a designated search space set group, a previous search space set group, or a default search space set group.

The transmission component 1004 may transmit the value for the dormancy timer in a configuration or the indication to switch to the dormant group.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
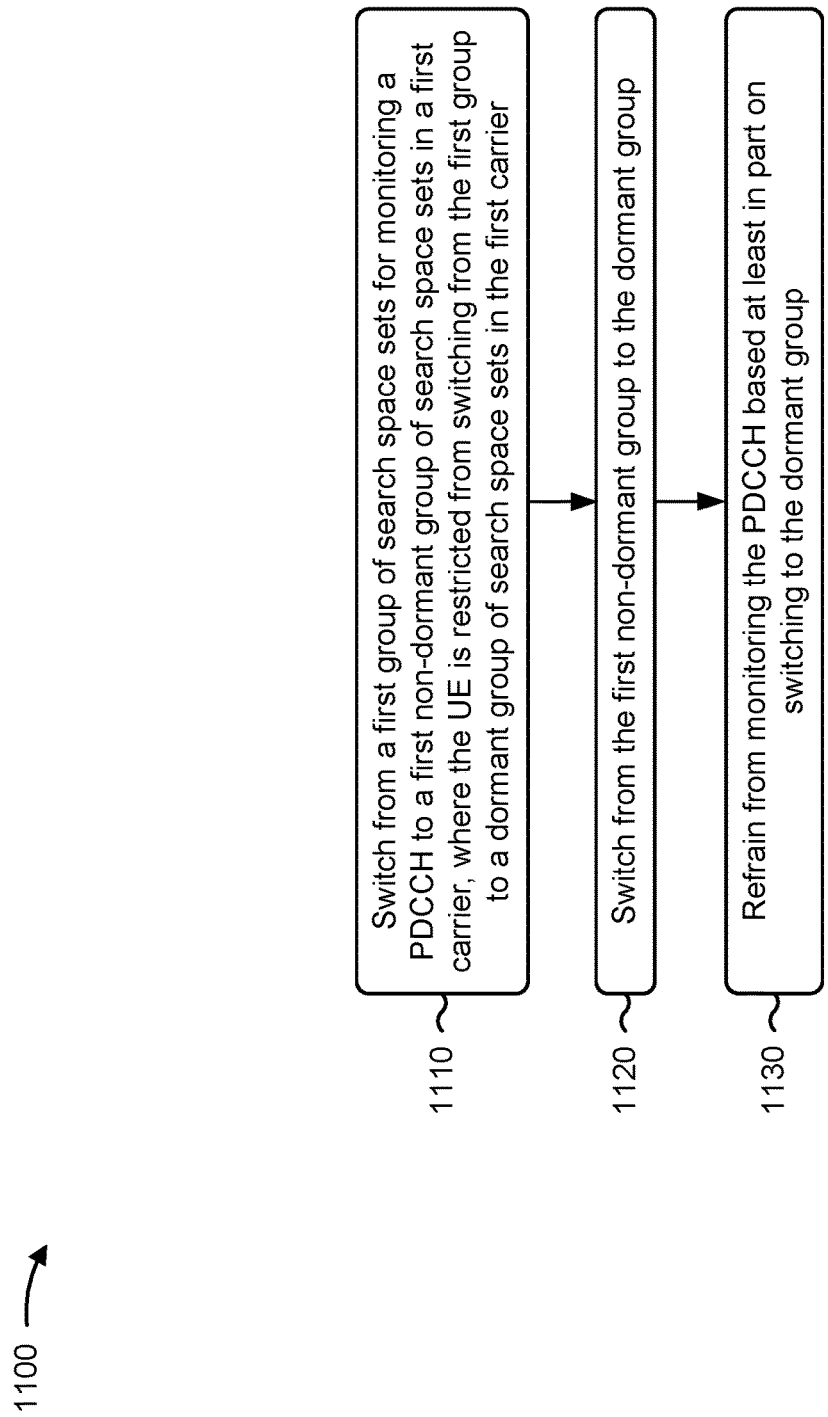
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120 depicted in FIGS. 1-2, UE 520 depicted in FIG. 5) performs operations associated with switching search space set groups for monitoring dormancy.

As shown in FIG. 11, in some aspects, process 1100 may include switching from a first group of search space sets for monitoring a PDCCH to a non-dormant group of search space sets in a first carrier (block 1110). For example, the UE (e.g., using monitoring component 1208 depicted in FIG. 12) may switch from a first group of search space sets for monitoring a PDCCH to a first non-dormant group of search space sets in a first carrier, as described above. In some aspects, the UE is restricted from switching from the first group to a dormant group of search space sets in the first carrier.

As further shown in FIG. 11, in some aspects, process 1100 may include switching from the non-dormant group to the dormant group (block 1120). For example, the UE (e.g., monitoring component 1208 depicted in FIG. 12) may switch from the first non-dormant group to the dormant group, as described above.

As further shown in FIG. 11, in some aspects, process 1100 may include refraining from monitoring the PDCCH based at least in part on switching to the dormant group (block 1130). For example, the UE (e.g., using monitoring component 1208 depicted in FIG. 12) may refrain from monitoring the PDCCH based at least in part on switching to the dormant group, as described above.

Process 1100 may include additional aspects, such as any single aspect or any combination of aspects described below and/or in connection with one or more other processes described elsewhere herein.

In a first aspect, the dormant group is an empty group with no search space sets.

In a second aspect, alone or in combination with the first aspect, the dormant group includes a dummy search space set with an infinite periodicity or zero PDCCH candidates.

In a third aspect, alone or in combination with one or more of the first and second aspects, switching from the first non-dormant group to the dormant group includes switching to the dormant group based at least in part on receiving an indication to switch to the dormant group for no PDCCH monitoring.

In a fourth aspect, alone or in combination with one or more of the first through third aspects, receiving the indication to switch to the dormant group includes receiving a value in a search space set group indication field in DCI or a MAC CE.

In a fifth aspect, alone or in combination with one or more of the first through fourth aspects, switching to the dormant group includes switching to the dormant group based at least in part on determining that inactivity on the PDCCH satisfies an inactivity threshold.

In a sixth aspect, alone or in combination with one or more of the first through fifth aspects, process 1100 includes receiving a switching rule for switching to the dormant group, where switching to the dormant group includes switching to the dormant group based at least in part on determining that one or more conditions satisfy the switching rule.

In a seventh aspect, alone or in combination with one or more of the first through sixth aspects, process 1100 includes switching from the dormant group to the first non-dormant group based at least in part on receiving an indication to switch to the first non-dormant group.

In an eighth aspect, alone or in combination with one or more of the first through seventh aspects, receiving the indication to switch to the first non-dormant group includes receiving the indication in a MAC CE on SPS resources.

In a ninth aspect, alone or in combination with one or more of the first through eighth aspects, receiving the indication to switch to the first non-dormant group includes receiving the indication in a field on a particular carrier, other than the first carrier, among multiple carriers.

In a tenth aspect, alone or in combination with one or more of the first through ninth aspects, receiving the indication to switch to the first non-dormant group includes receiving a value of a field in downlink control information in a common search space set that is monitored independently of a search space set group selection.

In an eleventh aspect, alone or in combination with one or more of the first through tenth aspects, process 1100 includes switching from the dormant group to the first non-dormant group based at least in part on expiration of a dormancy timer, and the expiration of the dormancy timer is based at least in part on one or more of a time duration, a quantity of slots, or a quantity of DRX cycles.

In a twelfth aspect, alone or in combination with one or more of the first through eleventh aspects, process 1100 includes switching from the dormant group to the first non-dormant group based at least in part on determining that communication activity in the first carrier satisfies an activity threshold.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
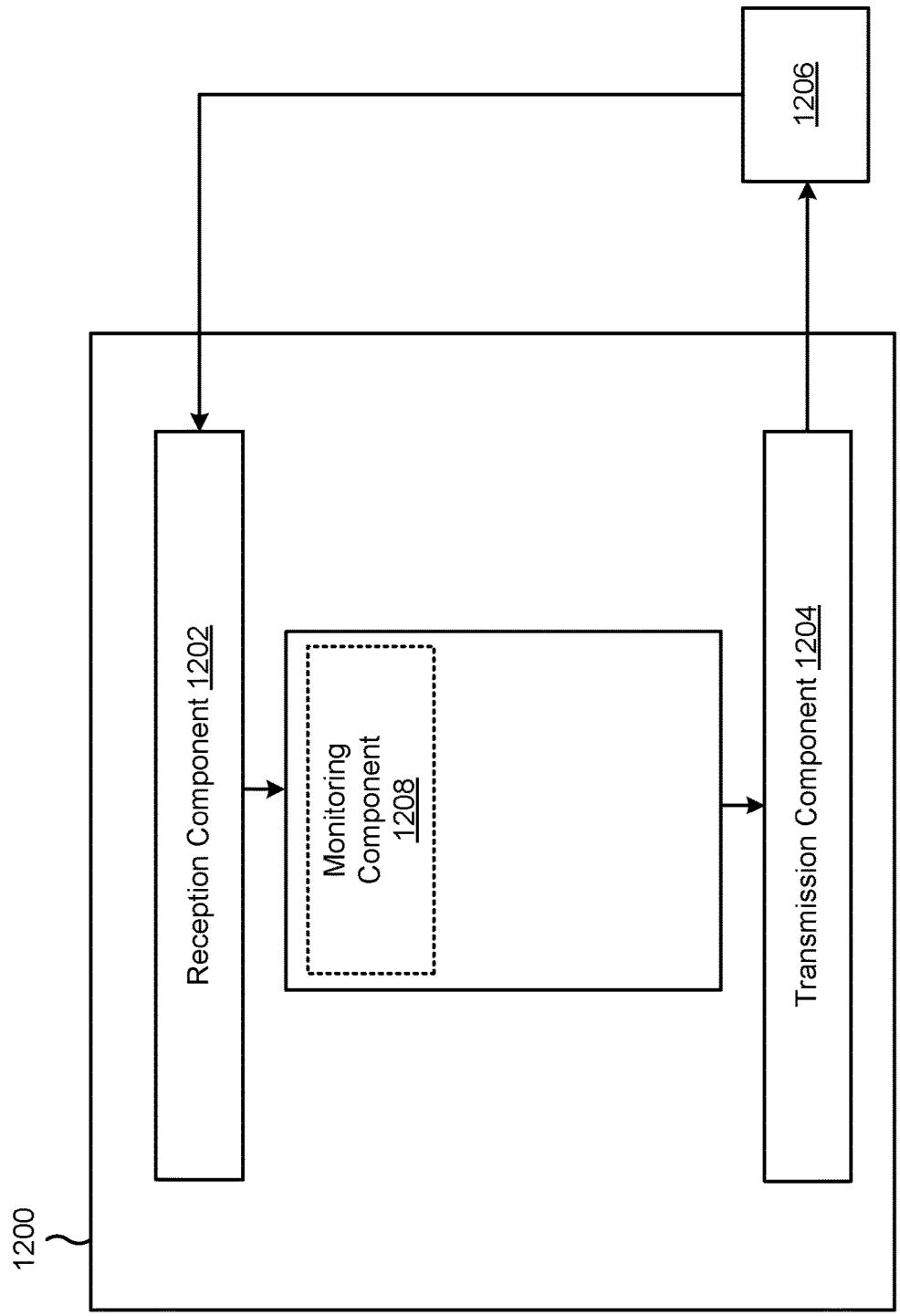
FIG. 12 is a block diagram of an example apparatus for wireless communication, in accordance with the present disclosure.

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a monitoring component 1208, among other examples.

In some aspects, the apparatus 1200 may be configured to perform one or more operations described herein in connection with FIGS. 1-6. Additionally, or alternatively, the apparatus 1200 may be configured to perform one or more processes described herein, such as process 1100 of FIG. 11. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The monitoring component 1208 may switch from a first group of search space sets for monitoring a PDCCH to a first non-dormant group of search space sets in a first carrier, where the UE is restricted from switching from the first group to a dormant group of search space sets in the first carrier. The monitoring component 1208 may switch from the first non-dormant group to the dormant group. The monitoring component 1208 may refrain from monitoring the PDCCH based at least in part on switching to the dormant group.

The reception component 1202 may receive a switching rule for switching to the dormant group, wherein switching to the dormant group includes switching to the dormant group based at least in part on determining that one or more conditions satisfy the switching rule.

The monitoring component 1208 may switch from the dormant group to the non-dormant group based at least in part on receiving an indication to switch to the first non-dormant group. The monitoring component 1208 may switch from the dormant group to the non-dormant group based at least in part on determining that communication activity in the first carrier satisfies an activity threshold.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Another technique that may provide flexibility for handling more traffic and for saving power may be PDCCH monitoring skipping. In some aspects, PDCCH monitoring skipping may involve a UE skipping PDCCH monitoring for a certain duration of time. According to some aspects, the duration of time during which the UE may skip PDCCH monitoring may coincide with traffic inactivity periods. In some aspects, a base station may transmit an indication to a UE to initiate PDCCH skipping for a certain duration of time. According to some aspects, along with DRX, which can be utilized to handle large-scale traffic inactivity (e.g., a few hundred milliseconds), PDCCH monitoring skipping can be utilized to handle smaller-scale traffic inactivity (e.g., a few slots or milliseconds). In some aspects, PDCCH monitoring skipping may provide additional flexibility for handling more traffic and for saving power.

Together, PDCCH search space monitoring skipping and dynamic PDCCH search space monitoring switching may provide enhanced flexibility for handling more traffic and for saving power. For example, in some aspects, whether a UE performs PDCCH search space monitoring skipping or PDCCH search space monitoring switching may be a function of wireless communication traffic characteristics and/or operation conditions. With the enhanced flexibility provided by PDCCH search space monitoring skipping and/or dynamic PDCCH search space monitoring switching, the processing of different groups of PDCCH search space sets may vary. For example, one or more groups may involve less PDCCH search space monitoring than one or more other groups. Additionally, one or more groups may involve no PDCCH search space monitoring at all (with few exceptions), such as when those groups are skipped as part of a PDCCH search space monitoring skipping operation performed by a UE. According to some aspects, a group of PDCCH search space sets that is not monitored or that is monitored less frequently may be referred to as a dormant group of PDCCH search space sets.

Aspects of this disclosure may provide techniques for utilizing PDCCH search space monitoring skipping and/or dynamic PDCCH search space monitoring switching, including techniques for PDCCH skipping based on PDCCH search space set group switching. For example, a UE may receive from a base station configuration information that includes information that identifies one or more dormant groups of PDCCH search space sets. The UE may switch from a first group, e.g., a dormant or non-dormant group, of PDCCH search space sets to at least one dormant group of PDCCH search space sets of the identified one or more dormant groups of PDCCH search space sets. In some aspects, a base station may transmit an indication to a UE to initiate the switch by the UE. According to some aspects, the UE may process one or more PDCCH search space sets of the at least one dormant group of PDCCH search space sets based at least in part on the received configuration information. In some aspects, the aspects of this disclosure may provide power saving flexibility while conserving power, processing resources, and signaling resources that would otherwise be consumed in the absence of aspects of this disclosure.

Figure 13:
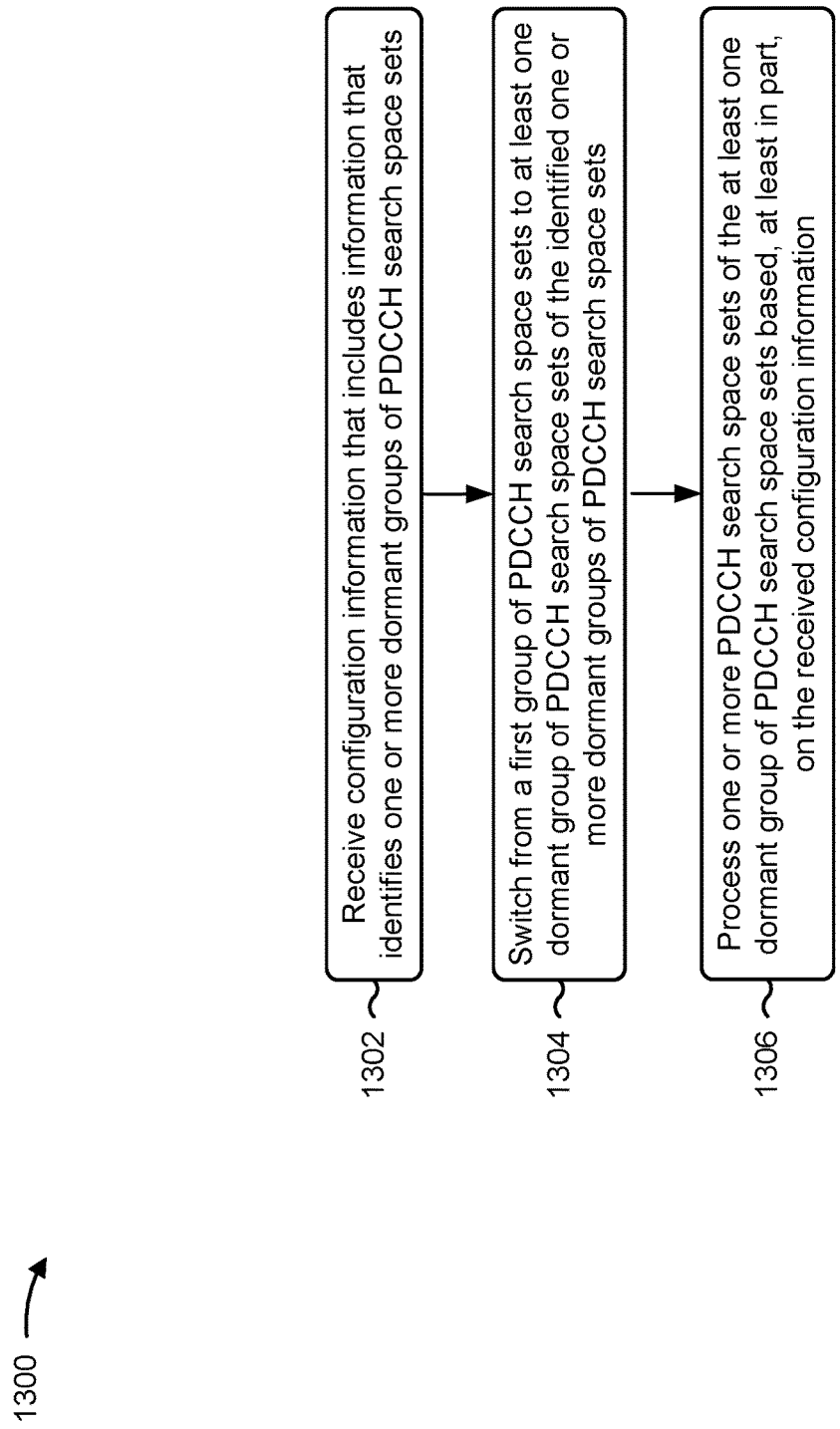
FIG. 13 is a diagram illustrating a method for PDCCH skipping based on PDCCH search space set group, in accordance with the present disclosure.

FIG. 13, as an example, shows a diagram illustrating a method for PDCCH skipping based on PDCCH search space set group switching, in accordance with the present disclosure. Aspects of method 1300 may be implemented with various other aspects of this disclosure described with respect to FIGS. 1-4 and 15-17, such as a mobile device/UE. For example, with reference to FIG. 2, controller/processor 280 of UE 120 may control UE 120 to perform method 1300.

FIG. 13 illustrates a method 1300 that may be performed by a UE, such as a UE 120. At block 1302, a UE, such as UE 120, may receive, from a base station, configuration information that includes information that identifies one or more dormant groups of PDCCH search space sets. For example, in some aspects, the configuration information may include an indication (e.g., an explicit indication, of the one or more dormant groups of PDCCH search space sets). In some aspects, the explicit indication may be a list identifying one or more dormant groups of PDCCH search space sets. In additional aspects, the configuration information may include an indication of one or more non-dormant groups of PDCCH search space sets. In some aspects, the indication of one or more non-dormant groups may be one or more indexes associated with one or more non-dormant groups of PDCCH search space sets, respectively. In some aspects, the one or more dormant groups of PDCCH search space sets may be identified based at least in part on the indication of the one or more non-dormant groups of PDCCH search space sets. For example, the dormant groups may be the groups not indicated as non-dormant groups. According to some aspects, the indication of the one or more non-dormant groups of PDCCH search space sets may be an implicit indication of the one or more dormant groups of PDCCH search space sets.

At block 1304, a UE may switch from a first group of PDCCH search space sets to at least one dormant group of PDCCH search space sets of the identified one or more dormant groups of PDCCH search space sets. In some aspects, the first group of PDCCH search space sets may be a dormant group. In additional aspects, the first group of PDCCH search space sets may be a non-dormant group.

In some aspects, the switch shown at block 1304 may be initiated by a base station. For example, a base station may determine that a UE is to stop monitoring the PDCCH. As another example, the base station may determine that a UE is to switch from a first group of search space sets for monitoring a PDCCH to a dormant group of search space sets in a first carrier. This may be due to a lack of activity on the PDCCH, a UE capability, traffic conditions, application information, a location of the UE, and/or other status information for the UE. In some aspects, a base station may determine that a UE is to switch from the first group of PDCCH search space sets to the at least one dormant group of PDCCH search space sets. The first group may be considered a non-dormant group. The at least one dormant group may be an empty group of search space sets, or may include a dummy search space set. The dummy search space set may have a high (e.g., infinite) periodicity and/or zero PDCCH candidates. The dummy search space set may not be counted in the budget of search space sets, which may be, for example, up to ten search space sets per bandwidth part. There may be multiple dormant groups and/or multiple non-dormant groups.

According to some aspects, a base station may transmit to a UE, and the UE may receive from the base station, an indication to switch from the first group to the dormant group. The UE may refrain from monitoring the PDCCH based at least in part on switching to the dormant group. For example, a base station may transmit a switch indication in DCI format 2_0 (slot format indication (SFI)), DCI format 2_6 (WUS or DCI with a cyclic redundancy check scrambled by a power saving radio network temporary identifier (DCP)), a non-fallback DCI format (e.g., 0_1, 0_2, 1_1, and 1_2), or a new dedicated DCI format. The switch indication received by the UE may be a value received in a search space set group indication field in DCI. The base station may also transmit the switch indication to the UE in a MAC CE. The indication may be an index of the dormant group, an inactivity timer value or another value specific to dynamic group switching.

Alternatively, or additionally, in some aspects, a base station may configure a UE to act on an implicit trigger. For example, the base station may configure the UE to switch to the dormant group based, at least in part on, detecting that there is little or no activity on the PDCCH. For example, a UE may switch to the dormant group if PDCCH activity (e.g., amount of traffic, frequency of traffic) satisfies an activity threshold (e.g., minimum activity threshold). In some aspects, the UE may switch to the dormant group based at least in part on determining that inactivity on the PDCCH satisfies an inactivity threshold. The base station may transmit, to the UE, configuration information that specifies that the UE is to switch to the dormant group based at least in part on determining that inactivity on the PDCCH satisfies an inactivity threshold.

In some aspects, the base station may configure the UE with one or more switching rules. A UE may receive from a base station a switching rule for switching to the dormant group, where switching to the dormant group includes switching to the dormant group based at least in part on determining that one or more conditions satisfy the switching rule. A UE may switch groups based at least in part on one or more conditions satisfying a switching rule. The conditions may include traffic activity, a power status of the UE, a traffic type, information associated with an application, a location of the UE, a history or status of other groups, and/or conditions on the PDCCH. A switching rule may be oriented toward power saving or toward higher performance.

According to some aspects, the UE may determine when to switch from the first group of PDCCH search space sets to the at least one dormant group of PDCCH search space sets, e.g., as shown at block 1304. For example, in some aspects, a UE may switch to the dormant group if a timer expires. A UE may switch to the dormant group if inactivity on the PDCCH exceeds a duration of the timer, or if a time duration between periods of activity satisfies a duration threshold. In some aspects, the UE may switch to a dormant group after a COT ends, if the UE is operating in an unlicensed band.

In some aspects, a UE may switch from the first group to the dormant group. The UE may switch to the dormant group based at least in part on receiving an indication from the base station to switch to the dormant group. As described in more detail below, the UE may refrain from monitoring the PDCCH based at least in part on switching to the dormant group. In this way, the UE may save power.

At block 1306, a UE may process one or more PDCCH search space sets of the at least one dormant group of PDCCH search space sets based at least in part on the received configuration information. In some aspects, the processed one or more PDCCH search space sets may be a subset of the PDCCH search space sets of the at least one dormant group of PDCCH search space sets. In additional aspects, the processed one or more PDCCH search space sets may be all of the PDCCH search space sets of the at least one dormant group of PDCCH search space sets.

In some aspects, the UE processing the one or more PDCCH search space sets (e.g., as shown at block 1306) may include the UE monitoring one or more PDCCH search spaces within the one or more PDCCH search space sets. For example, the configuration information received by the UE from the base station (e.g., as shown at block 1302) may include an indication (e.g., an explicit indication) indicating that the one or more PDCCH search space sets will include PDCCH search space monitoring. According to some aspects, the explicit indication indicating that the one or more PDCCH search space sets will include PDCCH search space monitoring may indicate that the one or more PDCCH search space sets, or one or more PDCCH search spaces within the one or more PDCCH search space sets, should be monitored irrespective of whether the one or more PDCCH search space sets, or one or more PDCCH search spaces within the one or more PDCCH search space sets, are part of a dormant group of PDCCH search space sets. In some aspects, such one or more PDCCH search space sets, or one or more PDCCH search spaces within the one or more PDCCH search space sets, that are monitored irrespective of whether or not they are located within a dormant group of PDCCH search space sets may be considered always-monitored PDCCH search space sets or always-monitored PDCCH search spaces.

According to some aspects, the UE processing the one or more PDCCH search space sets (e.g., as shown at block 1306) may include the UE monitoring one or more PDCCH search spaces within the one or more PDCCH search space sets based at least in part on a satisfaction of a rule for search space monitoring. In some aspects, the rule for search space monitoring may be a rule that specifies that common search spaces (CSSs) should be monitored even when the CSSs are part of a dormant group of PDCCH search space sets. In additional aspects, a rule for search space monitoring may also indicate that UE-specific search spaces (USSs) do not need to be monitored when part of a dormant group of PDCCH search space sets. Accordingly, in some aspects, rather than being explicitly told which PDCCH search spaces should still be monitored within a dormant group, a UE may implicitly determine which PDCCH search spaces to monitor within a dormant group based at least in part on one or more rules for search space monitoring. According to some aspects, search spaces, or search space sets, that are specified by rules to be monitored even within dormant groups of PDCCH search space sets may also be considered always-monitored PDCCH search spaces or always-monitored PDCCH search space sets.

In some aspects, the UE processing the one or more PDCCH search space sets (e.g., as shown at block 1306) may include the UE monitoring one or more PDCCH search spaces within the one or more PDCCH search space sets based at least in part on at least one of a round-trip time (RTT) timer indication or a retransmission (ReTx) timer indication. For example, the configuration information received by the UE from the base station (e.g., as shown at block 1302) may include at least one of a RTT timer indication or a ReTx timer indication. According to some aspects, monitoring based at least in part on at least one of the RTT timer indication or the ReTx timer indication may be considered discontinuous monitoring. For example, a UE may be configured to have discontinuous PDCCH search space monitoring disabled or enabled. As an example, a base station may send an indication to a UE to indicate whether the UE should enable or disable discontinuous PDCCH search space monitoring. In some aspects, when discontinuous PDCCH search space monitoring is disabled, the UE may not monitor PDCCH search spaces other than PDCCH search spaces part of always-monitored PDCCH search space sets. In additional aspects, when discontinuous PDCCH search space monitoring is enabled, the UE may monitor the one or more PDCCH search spaces within the one or more PDCCH search space sets based at least in part on at least one of the RTT timer indication or the ReTx timer indication. In some aspects, other timers may be used in addition to, or instead of, the RTT timer indication and/or the ReTx timer indication to perform discontinuous PDCCH search space monitoring. In some aspects, the at least one of the RTT timer indication or the ReTx timer indication may be configured for downlink wireless communication (e.g., separate from RTT timer indications and/or ReTx timer indications configured for uplink wireless communication).

According to some aspects, the at least one of the RTT timer indication or the ReTx timer indication may be associated with DRX configuration information. For example, in some aspects, the configuration information received by the UE from the base station (e.g., as shown at block 1302) may include DRX configuration information. According to some aspects, when DRX is configured for a UE (e.g., using the DRX configuration information), the at least one of the RTT timer indication or the ReTx timer indication may be the same as a RTT timer indication or ReTx timer indication provided with the DRX configuration or provided as part of the DRX configuration information. In additional aspects, when DRX is not configured (e.g., the configuration information received by the UE from the base station does not include DRX configuration information), the at least one of the RTT timer indication or the ReTx timer indication may be provided in the configuration information received by the UE from the base station (e.g., as shown at block 1302) for discontinuous PDCCH search space monitoring to be performed by a UE, but may not be associated with DRX configuration information. According to some aspects, processing the one or more PDCCH search space sets may also include at least one of suspending or invalidating at least one of a DRX on duration timer or a DRX inactivity timer associated with the DRX configuration information.

In some aspects, the UE processing the one or more PDCCH search space sets (e.g., as shown at block 1306) may include the UE refraining from monitoring one or more PDCCH search spaces within the one or more PDCCH search space sets. In other words, with few exceptions, such as the exceptions for always-monitored PDCCH search spaces or always-monitored PDCCH search space sets or the exceptions for discontinuous PDCCH search space monitoring, the UE may not monitor (e.g., refrain from monitoring) the one or more PDCCH search spaces within the one or more PDCCH search space sets.

In some aspects, the UE processing the one or more PDCCH search space sets (e.g., as shown at block 1306) may include the UE refraining from monitoring the one or more PDCCH search spaces within the one or more PDCCH search space sets based at least in part on a dormancy timer. For example, in some aspects, the configuration information received by the UE from the base station (e.g., as shown at block 1302) may include a dormancy timer that provides an indication of a time period to refrain from search space monitoring. As such, in some aspects, a UE may refrain from monitoring one or more PDCCH search spaces for a duration specified by the dormancy timer. According to some aspects, the dormancy timer may be started, or restarted, upon the UE receiving the configuration information that identifies the one or more dormant groups of PDCCH search space sets (e.g., as shown at block 1302).

According to some aspects, the dormancy timer value may be a time duration (e.g., milliseconds) or a quantity of slots. The dormancy timer value may also be a quantity of DRX cycles if DRX is configured, such that the UE remains in the dormant group until a start of a next n-th DRX cycle. Dormancy timer values may vary between dormant groups if there are multiple dormant groups. In some aspects, a dormancy timer value may be specific to a dormant group. According to some aspects, when more than one dormancy timer is configured, additional configuration information associated with dormancy timers may be transmitted from the base station to the UE for selecting one of the dormancy timers. According to some aspects, the additional configuration information may be transmitted with the configuration information received by the UE (e.g., as shown at block 1302). In some aspects, the UE may be configured (e.g., via an RRC message) with a dormancy timer value. The UE may receive a dormancy timer value in a configuration message (e.g., the configuration information shown at block 1302) or in the indication to switch to the dormant group. In other words, the value for the dormancy timer may be received in configuration information or the indication to switch to the dormant group. In some aspects, a base station may transmit to the UE the value for the dormancy timer (e.g., in configuration information or the indication to switch to the dormant group).

In some aspects, a UE may perform one or more of the operations disclosed herein within a single dormant group of PDCCH search space sets. For example, in some aspects, within a dormant group of PDCCH search space sets, a UE may at least one of: refrain from monitoring one or more PDCCH search spaces within the dormant group, perform discontinuous PDCCH search space monitoring of one or more PDCCH search spaces within the dormant group, or monitor always-monitored PDCCH search spaces or always-monitored PDCCH search space sets within the dormant group.

According to some aspects, a UE may switch between multiple groups of PDCCH search space sets. In one example, different groups may include a default group (Group 0), a first non-dormant group (Group 1), and a dormant group (Group 2). A UE may switch, by an indication in DCI, from Group 0 to Group 1, where both groups are non-dormant. The UE may switch by DCI, a MAC CE, or an implicit trigger to Group 2, which is a dormant group.

In some aspects, the UE may switch out of the dormant group to a non-dormant group. A group, such as Group 1, may be designated as a first non-dormant group to which the UE may switch. If a first non-dormant group is not designated, the UE may switch to a previous group or the default group, such as Group 0. According to some aspects, a UE may switch from the dormant group to a non-dormant group in the first carrier based at least in part on receiving an indication to switch to the non-dormant group.

In some aspects, the UE may switch out of the dormant group by an explicit trigger. For example, a base station may transmit to the UE an indication to switch from the dormant group to a non-dormant group in the first carrier. Because the UE may not be monitoring the PDCCH while dormant, the explicit trigger may be an indication in a MAC CE. The MAC CE may be received on semi-persistent scheduling (SPS) resources in the same carrier, if SPS is configured. If carrier aggregation is configured, the UE may receive an indication in a MAC CE or a search space set group indication field in DCI on a different carrier. For example, the UE may receive a cross-carrier search space set group indication. The indication may be specific to one carrier or may apply to multiple carriers. According to some aspects, a UE may receive (e.g., from the base station) the indication to switch to the non-dormant group in a field on a particular carrier, other than the first carrier, among multiple carriers.

In some aspects, the UE may receive (e.g., from the base station) the indication to switch to a non-dormant group in a value of a field in DCI, where the DCI is in a common search space set or in an always-monitored PDCCH search space set that is monitored independently of whether the UE is in a dormant group or a non-dormant group. For example, if the UE selected the dormant group and switched to the dormant group, the UE may still monitor the common search space set even if the UE is in the dormant group. In other words, the UE is not otherwise monitoring the PDCCH, but may still receive an indication to switch to a non-dormant group. According to some aspects, the base station transmitting the indication to switch to the non-dormant group may include the base station transmitting a value of a field in DCI in a common search space set or in an always-monitored PDCCH search space set that is monitored independent of a search space set group selection.

Alternatively, or additionally, in some aspects, the UE may switch from the dormant group to a non-dormant group based at least in part on an implicit trigger. In some aspects, the implicit trigger may be the dormancy timer. According to some aspects, the UE may switch from the dormant group to a non-dormant group upon expiration of the dormancy timer. The non-dormant group may be one of an indicated search space set group, a previous search space set group, or a default search space set group. According to some aspects, the non-dormant group may be the first non-dormant group switched to from the dormant group.

In some aspects, the implicit trigger may involve sensing communication activity in the carrier. For example, the UE may switch from the dormant group to the non-dormant group if activity detected in the carrier satisfies an activity threshold (e.g., minimum energy, preamble detection). Activity thresholds and sensing occasions may be specified by configuration. By switching to and from a dormant group, the UE may dynamically choose when to save power and when to increase monitoring performance.

According to some aspects, a UE may initiate a transition out of a dormant group to a non-dormant group when the UE has information to be transmitted on an uplink. For example, in some aspects, when the UE has information to be transmitted on an uplink (e.g., uplink information), the UE may switch from the at least one dormant group of PDCCH search space sets to a non-dormant group of PDCCH search space sets so that the UE may monitor one or more PDCCH search spaces to receive uplink configuration information. In some aspects, the UE may transmit information based at least in part on the received uplink configuration information. According to some aspects, the UE may initiate the transition out of the dormant group to the non-dormant group in a variety of ways. For example, in some aspects, the UE may transmit a scheduling request (SR) to a base station. According to some aspects, the UE may switch from the at least one dormant group of PDCCH search space sets to a non-dormant group of PDCCH search space sets based at least in part on the transmitted SR that is received by the base station.

In some aspects, configuration information may be received and/or transmitted at various instances. For example, in some aspects, the configuration information disclosed herein may be received and/or transmitted together in a single configuration message. In additional aspects, some configuration information disclosed herein may be received and/or transmitted at a different time than when other configuration information is received and/or transmitted. As a result, configuration information may be received and/or transmitted in one or more configuration messages.

Figure 14:
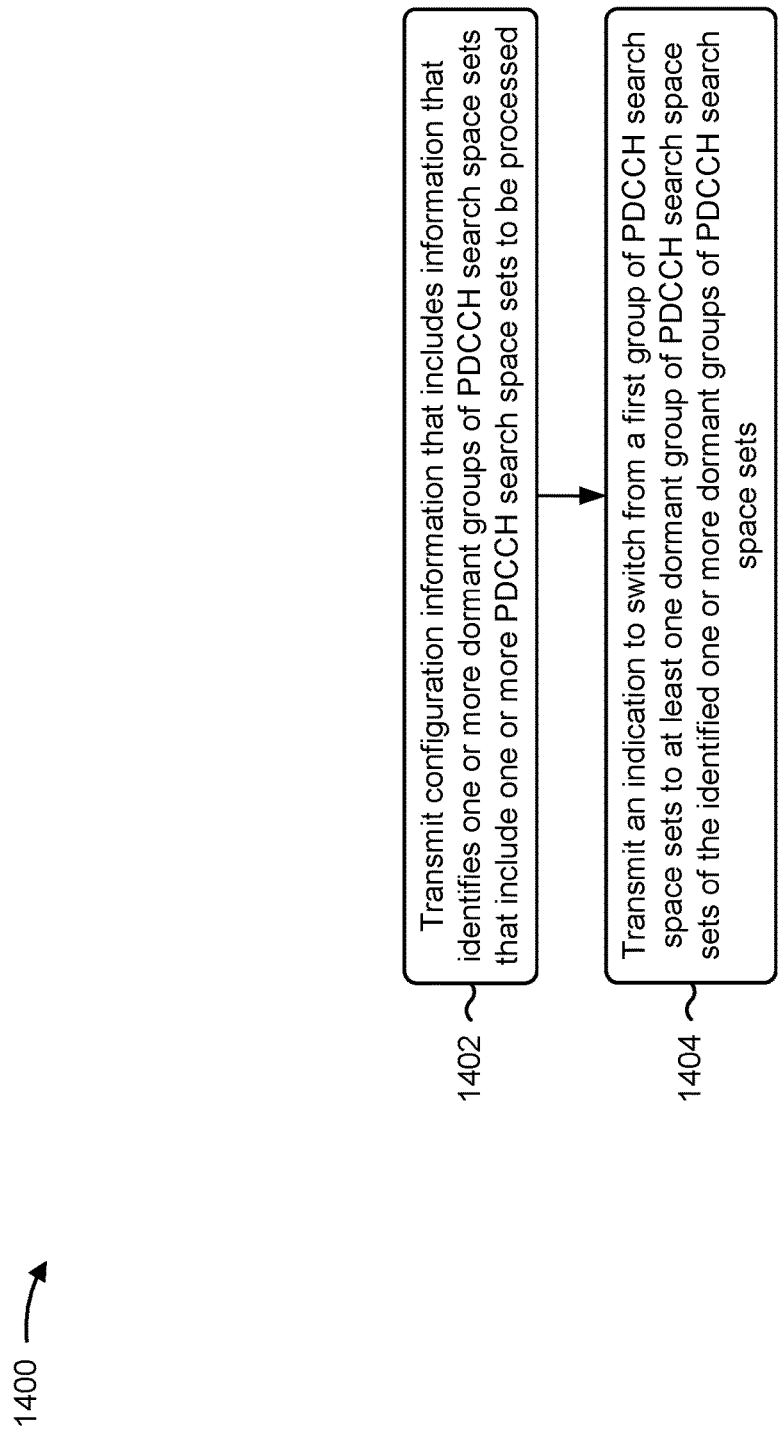
FIG. 14 is a diagram illustrating another method for PDCCH skipping based on PDCCH search space set group switching, in accordance with the present disclosure.

FIG. 14, as another example, shows a diagram illustrating another method for PDCCH skipping based on PDCCH search space set group switching, in accordance with the present disclosure. Aspects of method 1400 may be implemented with various other aspects of this disclosure described with respect to FIGS. 1-4, 15-16, and 18, such as a base station/gNB. For example, with reference to FIG. 2, controller/processor 240 of base station 110 may control base station 110 to perform method 1400.

FIG. 14 illustrates a method 1400 that may be performed by a base station, such as a base station 110. At block 1402, a base station, such as base station 110, may transmit configuration information that includes information that identifies one or more dormant groups of PDCCH search space sets that include one or more PDCCH search space sets to be processed based at least in part on the configuration information. At block 1404, a base station may transmit an indication to switch from a first group of PDCCH search space sets to at least one dormant group of PDCCH search space sets of the identified one or more dormant groups of PDCCH search space sets, where the at least one dormant group of PDCCH search space sets includes the one or more PDCCH search space sets.

Figure 15:
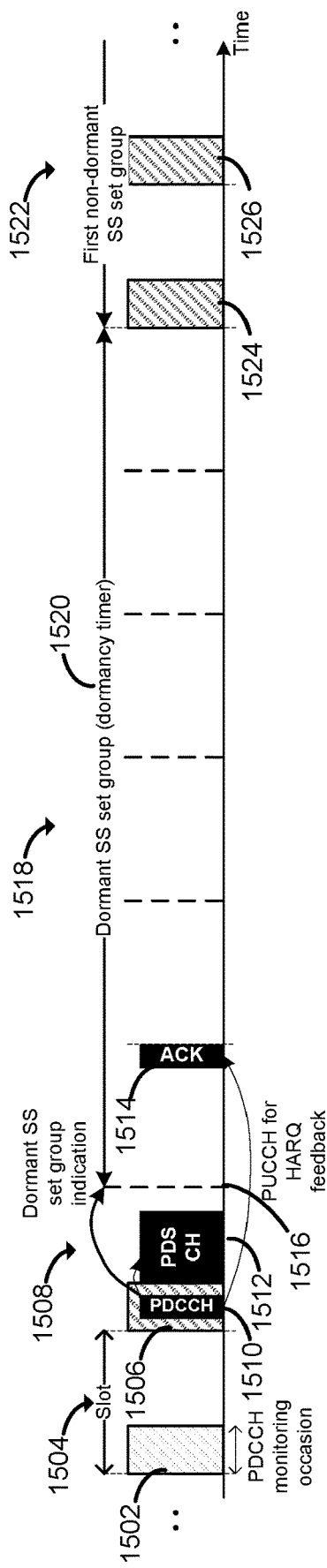
FIG. 15 is a diagram illustrating an example of PDCCH skipping based on PDCCH search space set group switching, in accordance with the present disclosure.

FIG. 15, as an example, shows a diagram illustrating an example of PDCCH skipping based on PDCCH search space set group switching, in accordance with the present disclosure. In particular, FIG. 15 illustrates an example of PDCCH skipping based on PDCCH search space set group switching in which discontinuous PDCCH search space monitoring is disabled.

As illustrated in FIG. 15, a UE may monitor PDCCH search spaces within a first PDCCH monitoring occasion 1502 within a first slot 1504. A UE may also monitor PDCCH search spaces within a second PDCCH monitoring occasion 1506 within a second slot 1508. In some aspects, the first and second PDCCH monitoring occasions 1502 and 1506 may be associated with the same non-dormant group of PDCCH search space sets. In additional aspects, the first and second PDCCH monitoring occasions 1502 and 1506 may be associated with different non-dormant groups of PDCCH search space sets. During the second PDCCH monitoring occasion 1506, the UE may receive from a base station configuration information within a PDCCH 1510 associated with a PDSCH 1512. The received configuration information may include an indication of one or more dormant groups of PDCCH search space sets 1518. According to some aspects, in response to receiving the configuration that includes the indication of the one or more dormant groups of PDCCH search space sets 1518, the UE may transmit (e.g., to the base station that transmitted the configuration information within the PDCCH 1510) an acknowledgement (ACK) 1514 acknowledging receipt of the configuration information. In additional aspects, in response to receiving the configuration that includes the indication of the one or more dormant groups of PDCCH search space sets 1518, the UE may switch (e.g., at the start 1516 of the next slot) to the indicated one or more dormant groups of PDCCH search space sets 1518. As illustrated in FIG. 15, the UE may refrain from monitoring PDCCH search spaces within the indicated one or more dormant groups of PDCCH search space sets 1518. To illustrate the lack of monitoring, there are no monitoring occasions illustrated in FIG. 15 during the time period that the UE refrains from monitoring PDCCH search spaces. As described previously, the one or more dormant groups of PDCCH search space sets 1518 may be associated with a dormancy timer 1520. As illustrated in FIG. 15, the UE may refrain from monitoring PDCCH search spaces within the indicated one or more dormant groups of PDCCH search space sets 1518 for a time duration specified by the dormancy timer 1520.

As illustrated in FIG. 15, the UE may switch from the indicated one or more dormant groups of PDCCH search space sets 1518 to a non-dormant group of PDCCH search space sets, such as the first non-dormant group of PDCCH search space sets 1522 illustrated in FIG. 15. The UE may switch to the non-dormant group of PDCCH search space sets 1522 based on an indication received from the base station or implicitly based on one or more rules being satisfied. In additional aspects, the UE may switch to the non-dormant group of PDCCH search space sets 1522 based, at least in part, upon expiration of the dormancy timer 1520 associated with the indicated one or more dormant groups of PDCCH search space sets 1518. In some aspects, the UE may monitor PDCCH search spaces within the non-dormant group of PDCCH search space sets 1522 illustrated in FIG. 15. For example, the UE may monitor PDCCH search spaces within the monitoring occasions 1524 and 1526 associated with the non-dormant group of PDCCH search space sets 1522 illustrated in FIG. 15.

Figure 16:
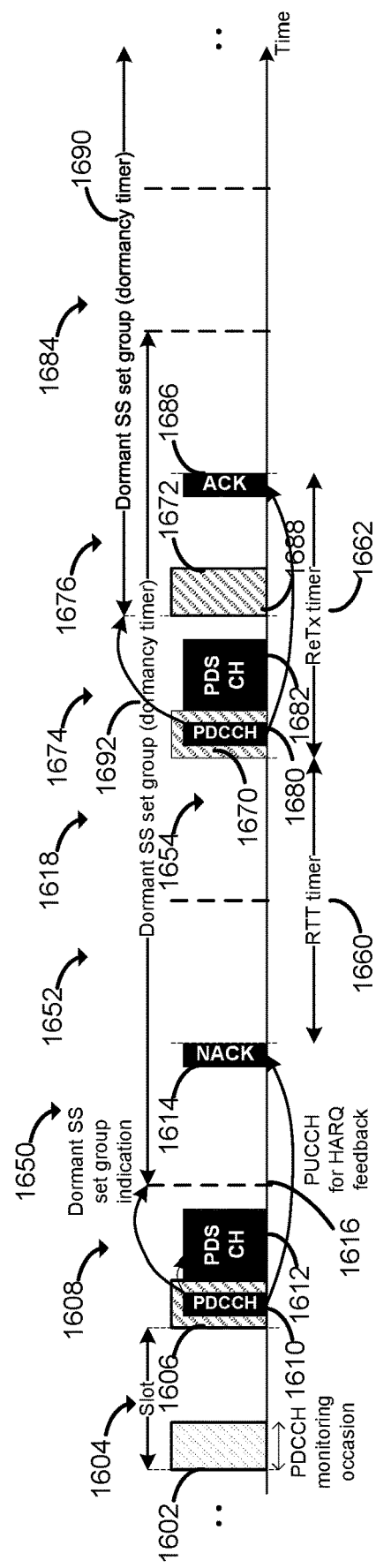
FIG. 16 is a diagram illustrating another example of PDCCH skipping based on PDCCH search space set group switching, in accordance with the present disclosure.

FIG. 16, as an example, shows a diagram illustrating another example of PDCCH skipping based on PDCCH search space set group switching, in accordance with the present disclosure. In particular, FIG. 16 illustrates an example of PDCCH skipping based on PDCCH search space set group switching in which discontinuous PDCCH search space monitoring is enabled and multiple dormancy timers are utilized.

As illustrated in FIG. 16, a UE may monitor PDCCH search spaces within a first PDCCH monitoring occasion 1602 within a first slot 1604. A UE may also monitor PDCCH search spaces within a second PDCCH monitoring occasion 1606 within a second slot 1608. In some aspects, the first and second PDCCH monitoring occasions 1602 and 1606 may be associated with the same non-dormant group of PDCCH search space sets. In additional aspects, the first and second PDCCH monitoring occasions 1602 and 1606 may be associated with different non-dormant groups of PDCCH search space sets. During the second PDCCH monitoring occasion 1606, the UE may receive from a base station configuration information within a PDCCH 1610 associated with a PDSCH 1612. The received configuration information may include an indication of one or more dormant groups of PDCCH search space sets 1618. In some aspects, the UE may not have received some information in the PDCCH 1610 or the PDSCH 1612. Accordingly, in response, the UE may transmit (e.g., to the base station that transmitted the configuration information within the PDCCH 1610) a negative acknowledgement (NACK) 1614. In additional aspects, the UE may still switch (e.g., at the start 1616 of the next slot) to the indicated one or more dormant groups of PDCCH search space sets 1618. As illustrated in FIG. 16, the UE may refrain from monitoring some of the PDCCH search spaces within the indicated one or more dormant groups of PDCCH search space sets 1618, such as the PDCCH search spaces within slots 1650, 1652, and 1654. However, because the UE may not have received some information in the PDCCH 1610 or the PDSCH 1612, as indicated by the NACK 1614 transmission, the UE may still perform discontinuous PDCCH search space monitoring in some of the slots.

As illustrated in FIG. 16, discontinuous PDCCH search space monitoring may be based at least in part on at least one of a RTT timer indication 1660 or a ReTx timer indication 1662. For example, in some aspects, PDCCH search space monitoring may be skipped in slot 1650 because of the indication of the one or more dormant groups of PDCCH search space sets 1618 and the UE's switching to that dormant group of PDCCH search space sets 1618. In additional aspects, PDCCH search space monitoring may be skipped in slots 1652 and 1654 based at least in part on the RTT timer indication 1660. After termination of the RTT timer, the UE may start the ReTx timer and begin monitoring PDCCH search spaces based at least in part on the ReTx timer. For example, as illustrated in FIG. 16, the UE may monitor PDCCH search spaces within monitoring occasions 1670 and 1672 within slots 1674 and 1676, respectively, based at least in part on the ReTx timer.

As illustrated in FIG. 16, during the monitoring occasion 1670, the UE may receive from a base station configuration information within a PDCCH 1680 associated with a PDSCH 1682. The received configuration information may include an indication of another one or more dormant groups of PDCCH search space sets 1684. According to some aspects, in response to receiving the configuration that includes the indication of the other one or more dormant groups of PDCCH search space sets 1684, the UE may transmit, e.g., to the base station that transmitted the configuration information within the PDCCH 1680, an ACK 1686 acknowledging receipt of the configuration information. In additional aspects, in response to receiving the configuration that includes the indication of the other one or more dormant groups of PDCCH search space sets 1684, the UE may switch (e.g., at the start 1688 of slot 1676) to the indicated other one or more dormant groups of PDCCH search space sets 1684. As illustrated in FIG. 16, the UE may refrain from monitoring some of the PDCCH search spaces within the indicated other one or more dormant groups of PDCCH search space sets 1684. To illustrate the lack of monitoring, there are no monitoring occasions illustrated in FIG. 16 after slot 1676 during the other one or more dormant groups of PDCCH search space sets 1684. In some aspects, the other one or more dormant groups of PDCCH search space sets 1684 may be associated with a dormancy timer 1690. In some aspects, the dormancy timer 1690 may be different than a dormancy timer 1692 associated with the one or more dormant groups of PDCCH search space sets 1618. As illustrated in FIG. 16, the UE may refrain from monitoring some of the PDCCH search spaces within the indicated other one or more dormant groups of PDCCH search space sets 1684 based at least in part on the dormancy timer 1690.

Figure 17:
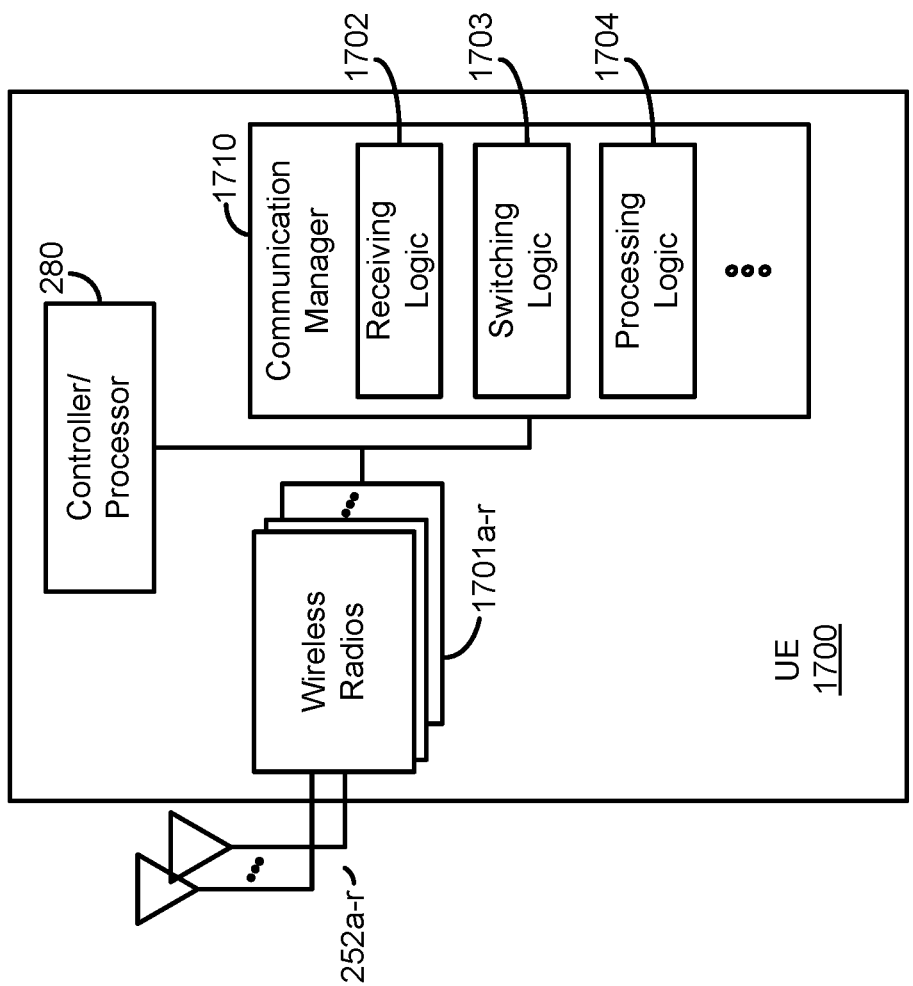
FIG. 17 is a block diagram illustrating a design of a UE configured in accordance with the present disclosure.

FIG. 17 shows a block diagram conceptually illustrating a design of a UE configured, in accordance with the present disclosure. UE 1700 may be configured to perform operations, including the blocks of the method 1300 described with reference to FIG. 13. In some implementations, the UE 1700 includes the structure, hardware, and components shown and described with reference to the UE 120 of FIGS. 1 and/or 2. For example, the UE 1700 includes the controller 280, which operates to execute logic or computer instructions illustrated in Communication Manager 1710, as well as controlling the components of the UE 1700 that provide the features and functionality of the UE 1700. The UE 1700, under control of the controller 280, transmits and receives signals via wireless radios 1701a-r and the antennas 252a-r. The wireless radios 1701a-r include various components and hardware, as illustrated in FIG. 2 for the UE 120, including the modulator and demodulators 254a-r, the MIMO detector 256, the receive processor 258, the transmit processor 264, and the TX MIMO processor 266.

Communication Manager 1710 may include Receiving Logic 1702, Switching Logic 1703, and Processing Logic 1704. Portions of one or more of the components 1702, 1703, or 1704 may be implemented at least in part in hardware or software. In some implementations, at least one of the components 1702, 1703, and 1703 is implemented at least in part as software stored in a memory (such as memory 282). For example, portions of one or more of the components 1702, 1703, and 1704 can be implemented as non-transitory instructions or code executable by a processor (such as the controller 280) to perform the functions or operations of the respective component.

One or more of the components 1702, 1703, or 1704 illustrated in Communication Manager 1710 may configure processor/controller 280 to carry out one or more procedures relating to wireless communication by the UE 1700, as previously described. For example, Receiving Logic 1702 may configure controller/processor 280 to carry out operations that include receiving configuration information that includes information that identifies one or more dormant groups of PDCCH search space sets, in any manner previously described, such as with reference to block 1302 (see FIG. 13). Additionally, Switching Logic 1703 may configure controller/processor 280 to carry out operations that include switching from a first group of PDCCH search space sets to at least one dormant group of PDCCH search space sets of the identified one or more dormant groups of PDCCH search space sets, in any manner previously described, such as with reference to block 1304 (see FIG. 13). In addition, Processing Logic 1704 may configure controller/processor 280 to carry out operations that include processing one or more PDCCH search space sets of the at least one dormant group of PDCCH search space sets based at least in part on the received configuration information, in any manner previously described, such as with reference to block 1306 (see FIG. 13). The UE 1700 may receive signals from or transmit signals to one or more network entities, such as the base station 110 of FIGS. 1-2 or a base station as illustrated in FIG. 18.

Figure 18:
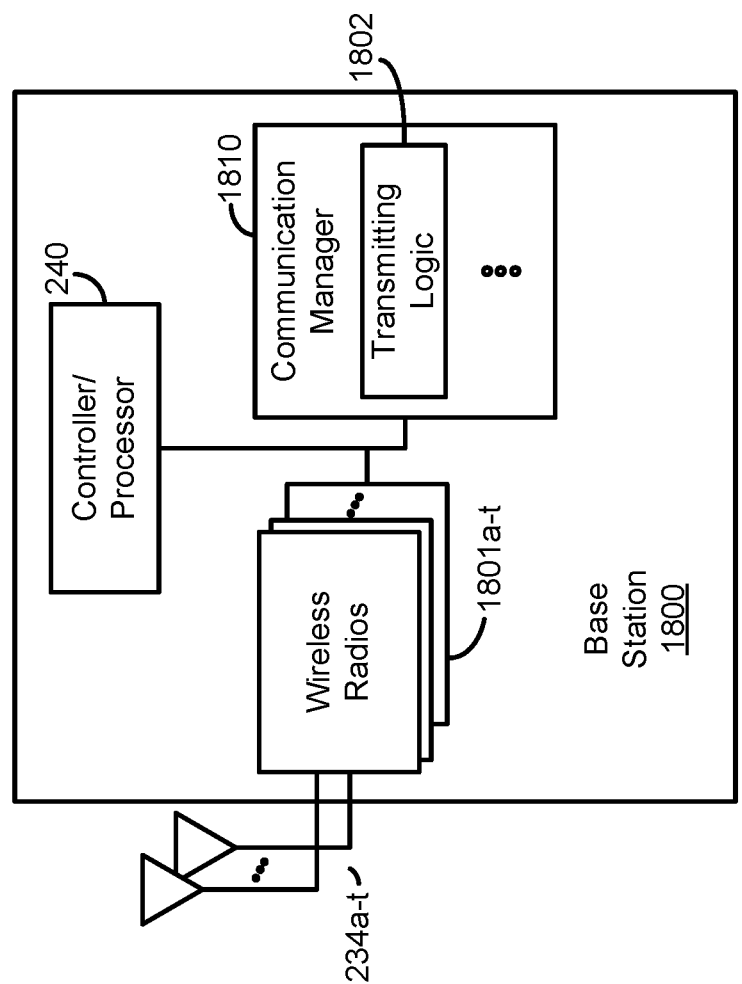
FIG. 18 is a block diagram illustrating a design of a base station configured in accordance with the present disclosure.

FIG. 18 is a block diagram conceptually illustrating a design of a base station (e.g., a gNB) configured, in accordance with the present disclosure. The base station 1800 may be configured to perform operations, including the blocks of the method 1400 described with reference to FIG. 14. In some implementations, the base station 1800 includes the structure, hardware, and components shown and described with reference to the base station 110 of FIGS. 1-2. For example, the base station 1800 may include the controller 240, which operates to execute logic or computer instructions illustrated in Communication Manager 1810, as well as controlling the components of the base station 1800 that provide the features and functionality of the base station 1800. The base station 1800, under control of the controller 240, transmits and receives signals via wireless radios 1801*a-t* and the antennas 234*a-t*. The wireless radios 1801*a-t* include various components and hardware, as illustrated in FIG. 2 for the base station 110, including the modulator and demodulators 232*a-t*, the transmit processor 220, the TX MIMO processor 230, the MIMO detector 236, and the receive processor 238.

Communication Manager 1810 may include Transmitting Logic 1802. Portions of component 1802 may be implemented at least in part in hardware or software. In some implementations, component 1802 may be implemented at least in part as software stored in a memory (such as memory 242). For example, portions of component 1802 can be implemented as non-transitory instructions or code executable by a processor (such as the controller 240) to perform the functions or operations of the respective component.

Component 1802 illustrated in Communication Manager 1810 may configure processor/controller 280 to carry out one or more procedures relating to wireless communication by the base station 1800, as previously described. For example, Transmitting Logic 1802 may configure controller/processor 280 to carry out operations that include transmitting configuration information that includes information that identifies one or more dormant groups of PDCCH search space sets that include one or more PDCCH search space sets to be processed based at least in part on the received configuration information, in any manner previously described, such as with reference to block 1402 (see FIG. 14). Additionally, Transmitting Logic 1802 may configure controller/processor 280 to carry out operations that include transmitting an indication to switch from a first group of PDCCH search space sets to at least one dormant group of PDCCH search space sets of the identified one or more dormant groups of PDCCH search space sets, wherein the at least one dormant group of PDCCH search space sets includes the one or more PDCCH search space sets, in any manner previously described, such as with reference to block 1404 (see FIG. 14). The base station 1800 may receive signals from or transmit signals to one or more UEs, such as the UE 120 of FIGS. 1-2 or the UE as illustrated in FIG. 17.

It is noted that one or more blocks (or operations) described with reference to FIGS. 13 and 14 may be combined with one or more blocks (or operations) described with reference to another of the figures (e.g., of FIGS. 5-8). For example, one or more blocks (or operations) of FIG. 13 may be combined with one or more blocks (or operations) of FIG. 14. As another example, one or more blocks associated with FIG. 17 or 18 may be combined with one or more blocks (or operations) associated with FIG. 1 or 2.

In some aspects, techniques for PDCCH skipping based on PDCCH search space set group switching may include a UE receiving configuration information that includes information that identifies one or more dormant groups of PDCCH search space sets. Techniques for PDCCH skipping based on PDCCH search space set group switching may also include a UE switching from a first group of PDCCH search space sets to at least one dormant group of PDCCH search space sets of the identified one or more dormant groups of PDCCH search space sets. Techniques for PDCCH skipping based on PDCCH search space set group switching may further include the UE processing one or more PDCCH search space sets of the at least one dormant group of PDCCH search space sets based at least in part on the received configuration information.

Techniques for PDCCH skipping based on PDCCH search space set group switching may include additional aspects, such as any single aspect or any combination of aspects described below and/or in connection with one or more other processes described elsewhere herein.

In a first aspect, the received configuration information includes an indication indicating that the one or more PDCCH search space sets will include PDCCH search space monitoring, and processing the one or more PDCCH search space sets includes monitoring one or more PDCCH search spaces within the one or more PDCCH search space sets.

In a second aspect, alone or in combination with the first aspect, processing the one or more PDCCH search space sets includes monitoring one or more PDCCH search spaces within the one or more PDCCH search space sets based at least in part on a satisfaction of a rule for search space monitoring.

In a third aspect, alone or in combination with one or more of the first and second aspects, the received configuration information includes at least one of an RTT indication or a retransmission timer indication, and processing the one or more PDCCH search space sets includes monitoring one or more PDCCH search spaces within the one or more PDCCH search space sets based at least in part on the at least one of the RTT indication or the retransmission timer indication.

In a fourth aspect, alone or in combination with one or more of the first through third aspects, the received configuration information includes DRX configuration information, and the at least one of the RTT indication or the retransmission timer indication is associated with the DRX configuration information, and processing the one or more PDCCH search space sets further includes at least one of suspending or invalidating at least one of a DRX on duration timer or a DRX inactivity timer associated with the DRX configuration information.

In a fifth aspect, alone or in combination with one or more of the first through fourth aspects, processing the one or more PDCCH search space sets includes refraining from monitoring one or more PDCCH search spaces within the one or more PDCCH search space sets.

In a sixth aspect, alone or in combination with one or more of the first through fifth aspects, the received configuration information includes a dormancy timer that provides an indication of a time period to refrain from search space monitoring, and processing the one or more PDCCH search space sets includes refraining from monitoring the one or more PDCCH search spaces within the one or more PDCCH search space sets based at least in part on the dormancy timer.

In a seventh aspect, alone or in combination with one or more of the first through sixth aspects, the dormancy timer is started upon receiving the configuration information that identifies the one or more dormant groups of PDCCH search space sets.

In an eighth aspect, alone or in combination with one or more of the first through seventh aspects, the received configuration information includes an indication of the one or more dormant groups of PDCCH search space sets.

In a ninth aspect, alone or in combination with one or more of the first through eighth aspects, the received configuration information includes an indication of one or more non-dormant groups of PDCCH search space sets, and the one or more dormant groups of PDCCH search space sets are identified based at least in part on the indication of the one or more non-dormant groups of PDCCH search space sets.

In some aspects, techniques for PDCCH skipping based on PDCCH search space set group switching may include a base station transmitting configuration information that includes information that identifies one or more dormant groups of PDCCH search space sets that include one or more PDCCH search space sets to be processed based at least in part on the received configuration information. Techniques for PDCCH skipping based on PDCCH search space set group switching may further include the base station transmitting an indication to switch from a first group of PDCCH search space sets to at least one dormant group of PDCCH search space sets of the identified one or more dormant groups of PDCCH search space sets, where the at least one dormant group of PDCCH search space sets includes the one or more PDCCH search space sets.

Techniques for PDCCH skipping based on PDCCH search space set group switching may include additional aspects, such as any single aspect or any combination of aspects described below and/or in connection with one or more other processes described elsewhere herein.

In a tenth aspect, the transmitted configuration information includes an indication indicating that the one or more PDCCH search space sets will include PDCCH search space monitoring such that one or more PDCCH search spaces within the one or more PDCCH search space sets to be processed are monitored.

In an eleventh aspect, alone or in combination with the tenth aspect, one or more PDCCH search spaces within the one or more PDCCH search space sets to be processed are monitored based at least in part on a satisfaction of a rule for search space monitoring.

In a twelfth aspect, alone or in combination with one or more of the tenth aspect through the eleventh aspect, the transmitted configuration information includes at least one of an RTT indication or a retransmission timer indication such that one or more PDCCH search spaces within the one or more PDCCH search space sets to be processed are monitored based at least in part on the at least one of the round-trip timer indication or the retransmission timer indication.

In a thirteenth aspect, alone or in combination with one or more of the tenth aspect through the twelfth aspect, the transmitted configuration information includes DRX configuration information, and the at least one of the RTT indication or the retransmission timer indication is associated with the DRX configuration information, and at least one of a DRX on duration timer or a DRX inactivity timer associated with the DRX configuration information is at least one of suspended or invalidated.

In a fourteenth aspect, alone or in combination with one or more of the tenth aspect through the thirteenth aspect, one or more PDCCH search spaces within the one or more PDCCH search space sets to be processed are not monitored.

In a fifteenth aspect, alone or in combination with one or more of the tenth aspect through the fourteenth aspect, the transmitted configuration information includes a dormancy timer that provides an indication of a time period to refrain from search space monitoring such that the one or more PDCCH search spaces within the one or more PDCCH search space sets to be processed are not monitored based at least in part on the dormancy timer.

In a sixteenth aspect, alone or in combination with one or more of the tenth aspect through the fifteenth aspect, the dormancy timer is started based at least in part on the transmitted configuration information that identifies the one or more dormant groups of PDCCH search space sets.

In a seventeenth aspect, alone or in combination with one or more of the tenth aspect through the sixteenth aspect, the transmitted configuration information includes an indication of the one or more dormant groups of PDCCH search space sets.

In an eighteenth aspect, alone or in combination with one or more of the tenth aspect through the seventeenth aspect, the transmitted configuration information includes an indication of one or more non-dormant groups of PDCCH search space sets, and the one or more dormant groups of PDCCH search space sets are identified based at least in part on the indication of the one or more non-dormant groups of PDCCH search space sets.

The following provides an overview of some Aspects of the present disclosure:

Aspect 1: A method of wireless communication performed by a user equipment (UE), comprising: switching from a first group of search space sets for monitoring a physical downlink control channel (PDCCH) to a dormant group of search space sets in a first carrier; and refraining from monitoring the PDCCH based at least in part on switching to the dormant group.

Aspect 2: The method of Aspect 1, wherein the dormant group is an empty group with no search space sets.

Aspect 3: The method of Aspect 1, wherein the dormant group includes a dummy search space set with an infinite periodicity or zero PDCCH candidates.

Aspect 4: The method of any of Aspects 1-3, wherein switching to the dormant group includes switching to the dormant group based at least in part on receiving an indication to switch to the dormant group for no PDCCH monitoring.

Aspect 5: The method of Aspect 4, wherein receiving the indication to switch to the dormant group includes receiving a value in a search space set group indication field in downlink control information.

Aspect 6: The method of Aspect 4, wherein receiving the indication to switch to the dormant group includes receiving the indication in a medium access control control element.

Aspect 7: The method of any of Aspects 1-6, wherein receiving the indication to switch to the dormant group includes receiving the indication only in a designated non-dormant group.

Aspect 8: The method of any of Aspects 1-7, wherein switching to the dormant group includes switching to the dormant group based at least in part on determining that inactivity on the PDCCH satisfies an inactivity threshold.

Aspect 9: The method of any of Aspects 1-8, further comprising receiving a switching rule for switching to the dormant group, wherein switching to the dormant group includes switching to the dormant group based at least in part on determining that one or more conditions satisfy the switching rule.

Aspect 10: The method of any of Aspects 1-9, further comprising switching from the dormant group to a non-dormant group in the first carrier based at least in part on receiving an indication to switch to the non-dormant group.

Aspect 11: The method of Aspect 10, wherein receiving the indication to switch to the non-dormant group includes receiving the indication in a medium access control control element (MAC CE) on semi-persistent scheduling resources.

Aspect 12: The method of Aspect 10, wherein receiving the indication to switch to the non-dormant group includes receiving the indication in a field on a particular carrier, other than the first carrier, among multiple carriers.

Aspect 13: The method of Aspect 10, wherein receiving the indication to switch to the non-dormant group includes receiving a value of a field in downlink control information in a common search space set that is monitored independently of a search space set group selection.

Aspect 14: The method of any of Aspects 1-13, further comprising switching from the dormant group to a non-dormant group based at least in part on expiration of a dormancy timer, wherein the non-dormant group is one of a designated search space set group, a previous search space set group, or a default search space set group.

Aspect 15: The method of Aspect 14, wherein the expiration of the dormancy timer is based at least in part on a value for the dormancy timer received in a configuration or an indication to switch to the dormant group.

Aspect 16: The method of Aspect 14, wherein the expiration of the dormancy timer is based at least in part on one or more of a time duration, a quantity of slots, or a quantity of discontinuous reception cycles.

Aspect 17: The method of any of Aspects 1-16, further comprising switching from the dormant group to a non-dormant group based at least in part on determining that communication activity in the first carrier satisfies an activity threshold.

Aspect 18: A method of wireless communication performed by a base station, comprising: determining that a user equipment (UE) is to switch from a first group of search space sets for monitoring a physical downlink control channel (PDCCH) to a dormant group of search space sets in a first carrier; and transmitting, to the UE, an indication to switch to the dormant group such that the UE refrains from monitoring the PDCCH based at least in part on switching to the dormant group.

Aspect 19: The method of Aspect 18, wherein the dormant group is an empty group with no search space sets.

Aspect 20: The method of Aspect 18, wherein the dormant group includes a dummy search space set with an infinite periodicity or zero PDCCH candidates.

Aspect 21: The method of any of Aspects 18-20, wherein transmitting the indication to switch to the dormant group includes transmitting a value in a search space set group indication field in downlink control information.

Aspect 22: The method of any of Aspects 18-20, wherein transmitting the indication to switch to the dormant group includes transmitting the indication in a medium access control control element (MAC CE).

Aspect 23: The method of any of Aspects 18-22, further comprising transmitting, to the UE, a configuration that specifies that the UE is to switch to the dormant group based at least in part on determining that inactivity on the PDCCH satisfies an inactivity threshold.

Aspect 24: The method of any of Aspects 18-23, further comprising transmitting, to the UE, a switching rule for switching to the dormant group, wherein the switching rule specifies that the UE is to switch to the dormant group based at least in part on determining that one or more conditions satisfy the switching rule.

Aspect 25: The method of any of Aspects 18-24, further comprising transmitting, to the UE, an indication to switch from the dormant group to a non-dormant group in the first carrier.

Aspect 26: The method of Aspect 25, wherein transmitting the indication to switch to the non-dormant group includes transmitting the indication in a medium access control control element (MAC CE) on semi-persistent scheduling resources.

Aspect 27: The method of Aspect 25, wherein transmitting the indication to switch to the non-dormant group includes transmitting the indication in a field on a particular carrier, other than the first carrier, among multiple carriers.

Aspect 28: The method of Aspect 25, wherein transmitting the indication to switch to the non-dormant group includes transmitting a value of a field in downlink control information in a common search space set that is monitored independently of a search space set group selection.

Aspect 29: The method of any of Aspects 18-28, wherein transmitting the indication to switch to the dormant group includes transmitting the indication only in a designated non-dormant group.

Aspect 30: The method of any of Aspects 18-29, further comprising transmitting, to the UE, a value for a dormancy timer, wherein the UE is to switch from the dormant group to a non-dormant group based at least in part on expiration of the dormancy timer, and wherein the non-dormant group is one of a designated search space set group, a previous search space set group, or a default search space set group.

Aspect 31: The method of Aspect 30, further comprising transmitting the value for the dormancy timer in a configuration or an indication to switch to the dormant group.

Aspect 32: The method of Aspect 30, wherein the expiration of the dormancy timer is based at least in part on one or more of a time duration, a quantity of slots, or a quantity of discontinuous reception cycles.

Aspect 33: A method of wireless communication performed by a user equipment (UE), comprising: switching from a first group of search space sets for monitoring a physical downlink control channel (PDCCH) to a first non-dormant group of search space sets in a first carrier, wherein the UE is restricted from switching from the first group to a dormant group of search space sets in the first carrier; switching from the first non-dormant group to the dormant group; and refraining from monitoring the PDCCH based at least in part on switching to the dormant group.

Aspect 34: The method of Aspect 33, wherein the dormant group is an empty group with no search space sets.

Aspect 35: The method of Aspect 33, wherein the dormant group includes a dummy search space set with an infinite periodicity or zero PDCCH candidates.

Aspect 36: The method of any of Aspects 33-35, wherein switching from the first non-dormant group to the dormant group includes switching to the dormant group based at least in part on receiving an indication to switch to the dormant group.

Aspect 37: The method of Aspect 36, wherein receiving the indication to switch to the dormant group includes receiving a value in a search space set group indication field in downlink control information or a medium access control control element (MAC CE).

Aspect 38: The method of any of Aspects 33-37, wherein switching to the dormant group includes switching to the dormant group based at least in part on determining that inactivity on the PDCCH satisfies an inactivity threshold.

Aspect 39: The method of any of Aspects 33-38, further comprising receiving a switching rule for switching to the dormant group, wherein switching to the dormant group includes switching to the dormant group based at least in part on determining that one or more conditions satisfy the switching rule.

Aspect 40: The method of any of Aspects 33-39, further comprising switching from the dormant group to the first non-dormant group based at least in part on receiving an indication to switch to the non-dormant group.

Aspect 41: The method of Aspect 40, wherein receiving the indication to switch to the first non-dormant group includes receiving the indication in a medium access control control element on semi-persistent scheduling resources.

Aspect 42: The method of Aspect 40, wherein receiving the indication to switch to the non-dormant group includes receiving the indication in a field on a particular carrier, other than the first carrier, among multiple carriers.

Aspect 43: The method of Aspect 40, wherein receiving the indication to switch to the first non-dormant group includes receiving a value of a field in downlink control information in a common search space set that is monitored independently of a search space set group selection.

Aspect 44: The method of Aspect 40, further comprising switching from the dormant group to the first non-dormant group based at least in part on expiration of a dormancy timer, wherein the expiration of the dormancy timer is based at least in part on one or more of a time duration, a quantity of slots, or a quantity of discontinuous reception cycles.

Aspect 45: The method of any of Aspects 33-44, further comprising switching from the dormant group to the first non-dormant group based at least in part on determining that communication activity in the first carrier satisfies an activity threshold.

Aspect 46: An apparatus for wireless communication at a device, comprising a processor; memory coupled with the processor; and instructions stored in the memory and executable by the processor to cause the apparatus to perform the method of one or more of Aspects 1-45.

Aspect 47: A device for wireless communication, comprising a memory and one or more processors coupled to the memory, the one or more processors configured to perform the method of one or more of Aspects 1-45.

Aspect 48: An apparatus for wireless communication, comprising at least one means for performing the method of one or more of Aspects 1-45.

Aspect 49: A non-transitory computer-readable medium storing code for wireless communication, the code comprising instructions executable by a processor to perform the method of one or more of Aspects 1-45.

Aspect 50: A non-transitory computer-readable medium storing a set of instructions for wireless communication, the set of instructions comprising one or more instructions that, when executed by one or more processors of a device, cause the device to perform the method of one or more of Aspects 1-45.

The following provides an overview of some other Aspects of the present disclosure:

Aspect 1: A method for wireless communication performed by a user equipment (UE), the method comprising: receiving configuration information that includes information that identifies one or more dormant groups of physical downlink control channel (PDCCH) search space sets; switching from a first group of PDCCH search space sets to at least one dormant group of PDCCH search space sets of the identified one or more dormant groups of PDCCH search space sets; and processing one or more PDCCH search space sets of the at least one dormant group of PDCCH search space sets based at least in part on the received configuration information.

Aspect 2: The method of Aspect 1, wherein the dormant group is an empty group with no search space sets or a search space set with an infinite periodicity or zero PDCCH candidates.

Aspect 3: The method of Aspect 1 or 2, wherein the received configuration information includes an indication indicating that the one or more PDCCH search space sets will include PDCCH search space monitoring, and wherein processing the one or more PDCCH search space sets includes monitoring one or more PDCCH search spaces within the one or more PDCCH search space sets.

Aspect 4: The method of any of Aspects 1-3, wherein processing the one or more PDCCH search space sets includes monitoring one or more PDCCH search spaces within the one or more PDCCH search space sets based at least in part on a satisfaction of a rule for search space monitoring.

Aspect 5: The method of any of Aspects 1-4, wherein the received configuration information includes at least one of a round-trip timer indication or a retransmission timer indication, and wherein processing the one or more PDCCH search space sets includes monitoring one or more PDCCH search spaces within the one or more PDCCH search space sets based at least in part on the at least one of the round-trip timer indication or the retransmission timer indication.

Aspect 6: The method of Aspect 5, wherein the received configuration information includes discontinuous reception (DRX) configuration information, and wherein the at least one of the round-trip timer indication or the retransmission timer indication is associated with the DRX configuration information, and wherein processing the one or more PDCCH search space sets further includes at least one of suspending or invalidating at least one of a DRX on duration timer or a DRX inactivity timer associated with the DRX configuration information.

Aspect 7: The method of any of Aspects 1-6, wherein processing the one or more PDCCH search space sets includes refraining from monitoring one or more PDCCH search spaces within the one or more PDCCH search space sets.

Aspect 8: The method of Aspect 7, wherein the received configuration information includes a dormancy timer that provides an indication of a time period to refrain from search space monitoring, and wherein processing the one or more PDCCH search space sets includes refraining from monitoring the one or more PDCCH search spaces within the one or more PDCCH search space sets based at least in part on the dormancy timer.

Aspect 9: The method of Aspect 8, wherein the dormancy timer is started upon receiving the configuration information that identifies the one or more dormant groups of PDCCH search space sets.

Aspect 10: The method of any of Aspects 1-9, wherein the received configuration information includes an indication of the one or more dormant groups of PDCCH search space sets.

Aspect 11: The method of any of Aspects 1-10, wherein the received configuration information includes an indication of one or more non-dormant groups of PDCCH search space sets, and wherein the one or more dormant groups of PDCCH search space sets are identified based at least in part on the indication of the one or more non-dormant groups of PDCCH search space sets.

Aspect 12: A method for wireless communication performed by a base station, the method comprising: transmitting configuration information that includes information that identifies one or more dormant groups of physical downlink control channel (PDCCH) search space sets that include one or more PDCCH search space sets to be processed; and transmitting an indication to switch from a first group of PDCCH search space sets to at least one dormant group of PDCCH search space sets of the identified one or more dormant groups of PDCCH search space sets, wherein the at least one dormant group of PDCCH search space sets includes the one or more PDCCH search space sets.

Aspect 13: The method of Aspect 12, wherein the dormant group is an empty group with no search space sets or a search space set with an infinite periodicity or zero PDCCH candidates.

Aspect 14: The method of Aspect 12, wherein the transmitted configuration information includes an indication indicating that the one or more PDCCH search space sets will include PDCCH search space monitoring such that one or more PDCCH search spaces within the one or more PDCCH search space sets to be processed are monitored.

Aspect 15: The method of Aspect 14, wherein one or more PDCCH search spaces within the one or more PDCCH search space sets to be processed are monitored based at least in part on a satisfaction of a rule for search space monitoring.

Aspect 16: The method of any of Aspects 12-15, wherein the transmitted configuration information includes at least one of a round-trip timer indication or a retransmission timer indication such that one or more PDCCH search spaces within the one or more PDCCH search space sets to be processed are monitored based at least in part on the at least one of the round-trip timer indication or the retransmission timer indication.

Aspect 17: The method of Aspect 16, wherein the transmitted configuration information includes discontinuous reception (DRX) configuration information, wherein the at least one of the round-trip timer indication or the retransmission timer indication is associated with the DRX configuration information, and wherein at least one of a DRX on duration timer or a DRX inactivity timer associated with the DRX configuration information is at least one of suspended or invalidated.

Aspect 18: The method of any of Aspects 12-17, wherein one or more PDCCH search spaces within the one or more PDCCH search space sets to be processed are not monitored.

Aspect 19: The method of any of Aspects 12-18, wherein the transmitted configuration information includes a dormancy timer that provides an indication of a time period to refrain from search space monitoring such that the one or more PDCCH search spaces within the one or more PDCCH search space sets to be processed are not monitored based at least in part on the dormancy timer.

Aspect 20: The method of Aspect 19, wherein the dormancy timer is started based at least in part on the transmitted configuration information that identifies the one or more dormant groups of PDCCH search space sets.

Aspect 21: The method of any of Aspects 12-20, wherein the transmitted configuration information includes an indication of the one or more dormant groups of PDCCH search space sets.

Aspect 22: The method of any of Aspects 12-21, wherein the transmitted configuration information includes an indication of one or more non-dormant groups of PDCCH search space sets, and wherein the one or more dormant groups of PDCCH search space sets are identified based at least in part on the indication of the one or more non-dormant groups of PDCCH search space sets.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based at least in part on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      switch from a non-dormant search space set group to a dormant search space set group, the non-dormant search space set group being for monitoring a physical downlink control channel (PDCCH) and the dormant search space set group being for no PDCCH monitoring; and
      refrain from monitoring the PDCCH based at least in part on switching to the dormant search space set group.

2. The UE of claim 1, wherein the dormant search space set group is an empty group with no search space sets.

3. The UE of claim 1, wherein the dormant search space set group includes a dummy search space set with an infinite periodicity or zero PDCCH candidates.

4. The UE of claim 1, wherein the one or more processors, to switch to the dormant search space set group, are configured to switch to the dormant search space set group based at least in part on receiving an indication to switch to the dormant search space set group, and wherein the one or more processors, to receive the indication, are configured to one or more of:
   receive a value in a search space set group indication field in downlink control information;
   receive the indication in a medium access control control element (MAC CE); or
   receive the indication only in a designated non-dormant search space set group.

5. The UE of claim 1, wherein the one or more processors, to switch to the dormant search space set group, are configured to switch to the dormant search space set group based at least in part on determining that inactivity on the PDCCH satisfies an inactivity threshold.

6. The UE of claim 1, wherein the one or more processors are configured to receive a switching rule for switching to the dormant search space set group, and wherein the one or more processors, to switch to the dormant search space set group, are configured to switch to the dormant search space set group based at least in part on determining that one or more conditions satisfy the switching rule.

7. The UE of claim 1, wherein the one or more processors are configured to switch from the dormant search space set group to the non-dormant search space set group in a first carrier based at least in part on receiving an indication to switch to the non-dormant search space set group, and wherein the one or more processors, to receive the indication to switch to the non-dormant search space set group, are configured to one or more of:
   receive the indication in a medium access control control element (MAC CE) on semi-persistent scheduling resources;
   receive the indication in a field on a particular carrier, other than the first carrier, among multiple carriers; or
   receive a value of a field in downlink control information in a common search space set that is monitored independently of a search space set group selection.

8. The UE of claim 7, wherein the one or more processors are configured to switch from the dormant search space set group to a non-dormant search space set group based at least in part on expiration of a dormancy timer, and wherein the non-dormant search space set group is one of a designated search space set group, a previous search space set group, or a default search space set group.

9. The UE of claim 8, wherein the expiration of the dormancy timer is based at least in part on a value for the dormancy timer received in a configuration, an indication to switch to the dormant search space set group for no PDCCH monitoring, a time duration, a quantity of slots, or a quantity of discontinuous reception cycles.

10. The UE of claim 7, wherein the one or more processors are configured to switch from the dormant search space set group to a non-dormant search space set group based at least in part on determining that communication activity in the first carrier satisfies an activity threshold.

11. A user equipment (UE) for wireless communication, comprising:
one or more memories; and
one or more processors, coupled to the one or more memories, configured to:
switch from a first group of search space sets for monitoring a physical downlink control channel (PDCCH) to a first non-dormant search space set group, wherein the UE is restricted from switching from the first group to a dormant search space set group;
switch from the first non-dormant search space set group to the dormant search space set group; and
refrain from monitoring the PDCCH based at least in part on switching to the dormant search space set group.

12. The UE of claim 11, wherein the dormant search space set group is an empty group with no search space sets or a search space set with an infinite periodicity or zero PDCCH candidates.

13. The UE of claim 11, wherein the one or more processors, to switch from the first non-dormant search space set group to the dormant search space set group, are configured to switch to the dormant search space set group based at least in part on receiving an indication to switch to the dormant search space set group for no PDCCH monitoring or receiving a value in a search space set group indication field in downlink control information or a medium access control control element (MAC CE).

14. The UE of claim 11, wherein the one or more processors, to switch to the dormant search space set group, are configured to switch to the dormant search space set group based at least in part on determining that inactivity on the PDCCH satisfies an inactivity threshold.

15. The UE of claim 11, wherein the one or more processors are configured to receive a switching rule for switching to the dormant search space set group, and wherein the one or more processors, to switch to the dormant search space set group, are configured to switch to the dormant search space set group based at least in part on determining that one or more conditions satisfy the switching rule.

16. The UE of claim 11, wherein the one or more processors are configured to switch from the dormant search space set group to the first non-dormant search space set group in a first carrier based at least in part on receiving an indication to switch to the first non-dormant search space set group, and wherein the one or more processors, to switch to the first non-dormant search space set group, are configured to one or more of:
receive the indication in a medium access control control element (MAC CE) on semi-persistent scheduling resources;
receive the indication in a field on a particular carrier, other than the first carrier, among multiple carriers; or
receive a value of a field in downlink control information in a common search space set that is monitored independently of a search space set group selection.

17. The UE of claim 11, wherein the one or more processors are configured to switch from the dormant search space set group to the first non-dormant search space set group based at least in part on expiration of a dormancy timer, and wherein the expiration of the dormancy timer is based at least in part on one or more of a time duration, a quantity of slots, or a quantity of discontinuous reception cycles.

18. The UE of claim 16, wherein the one or more processors are configured to switch from the dormant search space set group to the first non-dormant search space set group based at least in part on determining that communication activity in the first carrier satisfies an activity threshold.

19. A user equipment (UE), comprising:
one or more memories; and
one or more processors, coupled to the one or more memories, configured to:
receive configuration information that includes information that identifies one or more dormant search space set groups associated with one or more group indexes of a plurality of group indexes;
switch from a non-dormant search space set group to at least one dormant search space set group of the identified one or more dormant search space set groups; and
process one or more PDCCH search space sets of the at least one dormant search space set group based at least in part on the received configuration information.

20. The UE of claim 19, wherein the at least one dormant search space set group is an empty group with no search space sets or a search space set with an infinite periodicity or zero PDCCH candidates.

21. The UE of claim 19, wherein the received configuration information includes an indication indicating that the one or more PDCCH search space sets will include PDCCH search space monitoring, and wherein the one or more processors, to process the one or more PDCCH search space sets, are configured to monitor one or more PDCCH search spaces within the one or more PDCCH search space sets.

22. The UE of claim 19, wherein the one or more processors, to process the one or more PDCCH search space sets, are configured to monitor one or more PDCCH search spaces within the one or more PDCCH search space sets based at least in part on a satisfaction of a rule for search space monitoring.

23. The UE of claim 19, wherein the received configuration information includes at least one of a round-trip timer indication or a retransmission timer indication, and wherein the one or more processors, to process the one or more PDCCH search space sets, are configured to monitor one or more PDCCH search spaces within the one or more PDCCH search space sets based at least in part on the at least one of the round-trip timer indication or the retransmission timer indication.

24. The UE of claim 23, wherein the received configuration information includes discontinuous reception (DRX) configuration information, wherein the at least one of the round-trip timer indication or the retransmission timer indication is associated with the DRX configuration information, and wherein the one or more processors, to process the one or more PDCCH search space sets, are configured to at least one of suspend or invalidate at least one of a DRX on duration timer or a DRX inactivity timer associated with the DRX configuration information.

25. The UE of claim 19, wherein the one or more processors, to process the one or more PDCCH search space sets, are configured to refrain from monitoring one or more PDCCH search spaces within the one or more PDCCH search space sets.

26. The UE of claim 25, wherein the received configuration information includes a dormancy timer that provides an indication of a time period to refrain from search space monitoring, and wherein the one or more processors, to process the one or more PDCCH search space sets, are configured to refrain from monitoring the one or more PDCCH search spaces within the one or more PDCCH search space sets based at least in part on the dormancy timer.

27. The UE of claim 26, wherein the dormancy timer is started upon receiving the configuration information that identifies the one or more dormant search space set groups.

28. The UE of claim 19, wherein the received configuration information includes an indication of the one or more dormant search space set groups.

29. The UE of claim 19, wherein the received configuration information includes an indication of one or more non-dormant search space set groups, and wherein the one or more dormant search space set groups are identified based at least in part on the indication of the one or more non-dormant search space set groups.

30. A network entity, comprising:
one or more memories; and
one or more processors, coupled to the one or more memories, configured to:
transmit configuration information that includes information that identifies one or more dormant search space set groups that include one or more PDCCH search space sets to be processed; and
transmit an indication to switch from a non-dormant search space set group to at least one dormant search space set group of the identified one or more dormant search space set groups, the at least one dormant search space set group being associated with a particular group index and including the one or more PDCCH search space sets.

* * * * *